(12) United States Patent
Yamaguchi

(10) Patent No.: US 10,298,853 B2
(45) Date of Patent: May 21, 2019

(54) IMAGE PROCESSING APPARATUS, METHOD OF CONTROLLING IMAGE PROCESSING APPARATUS, AND IMAGING APPARATUS

(71) Applicant: CANON KABUSHIKI KAISHA, Tokyo (JP)

(72) Inventor: Shota Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 15/404,688

(22) Filed: Jan. 12, 2017

(65) Prior Publication Data

US 2017/0200283 A1   Jul. 13, 2017

(30) Foreign Application Priority Data

Jan. 13, 2016  (JP) ................................ 2016-004181
Nov. 22, 2016  (JP) ................................ 2016-226621

(51) Int. Cl.
*H04N 5/232* (2006.01)
*H04N 5/235* (2006.01)

(52) U.S. Cl.
CPC ......... *H04N 5/2353* (2013.01); *H04N 5/2351* (2013.01); *H04N 5/23245* (2013.01); *H04N 5/23251* (2013.01)

(58) Field of Classification Search
None
See application file for complete search history.

(56) References Cited

U.S. PATENT DOCUMENTS

| 8,520,098 | B2 | 8/2013 | Watanabe |
| 8,885,091 | B2 | 11/2014 | Uehara |
| 9,313,416 | B2 | 4/2016 | Sasaki |
| 2011/0007131 | A1* | 1/2011 | Okada .................. H04N 19/597 348/42 |

(Continued)

FOREIGN PATENT DOCUMENTS

| JP | 2007-189665 A | 7/2007 |
| JP | 2011-010072 A | 1/2011 |

(Continued)

OTHER PUBLICATIONS

The above foreign patet documents were cited in the Aug. 14, 2018 Japanese Office Action, which is enclosed with an English Translation, that issued in Japanese Patent Application No. 2016226621.

*Primary Examiner* — Eileen M Adams
(74) *Attorney, Agent, or Firm* — Cowan, Liebowitz & Latman, P.C.

(57) ABSTRACT

An image processing apparatus including a recording unit configured to acquire a plurality of image data and record the plurality of image data in a recording medium includes an acquisition unit configured to acquire depth distribution information of an object corresponding to image data, and a control unit configured to perform a process of recording the plurality of image data by performing switching between a first mode in which the recording unit records the image data and the depth distribution information corresponding to the image data in the recording medium and a second mode in which the recording unit records the image data in the recording medium without recording the depth distribution information.

33 Claims, 27 Drawing Sheets

(56) References Cited

U.S. PATENT DOCUMENTS

| | | | |
|---|---|---|---|
| 2012/0287308 A1 | 11/2012 | Kojima et al. | |
| 2013/0176566 A1* | 7/2013 | Mitchell | G02B 27/2264 356/364 |
| 2015/0189221 A1* | 7/2015 | Nakase | G11B 27/30 386/225 |
| 2015/0286875 A1* | 10/2015 | Land | H04N 19/46 382/103 |

FOREIGN PATENT DOCUMENTS

| | | |
|---|---|---|
| JP | 2011-166391 A | 8/2011 |
| JP | 2011-233985 A | 11/2011 |
| JP | 2011-239195 A | 11/2011 |
| JP | 2011-244144 A | 12/2011 |
| JP | 2013-005091 A | 1/2013 |
| JP | 2014-179756 A | 9/2014 |
| JP | 2015-119416 A | 6/2015 |

* cited by examiner

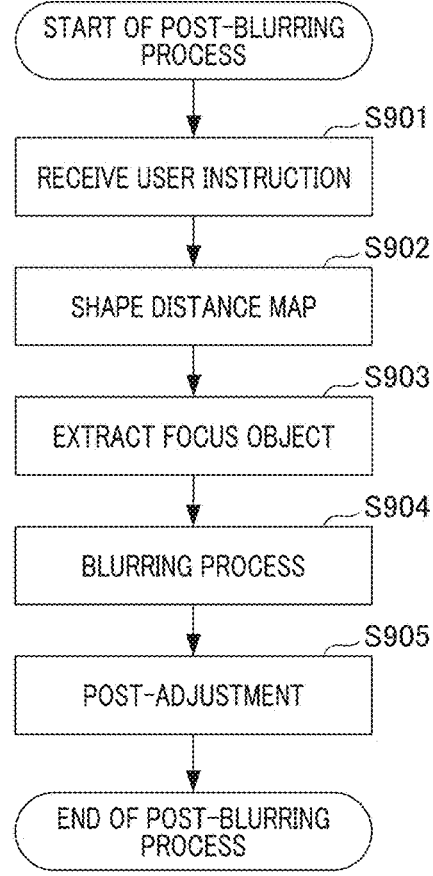
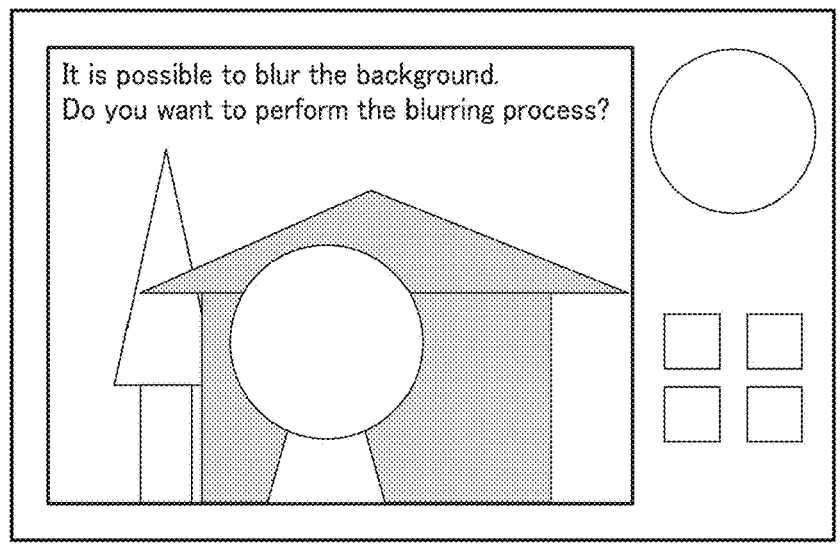

FIRST GRADATION
CHARACTERISTIC

IMAGE PROCESSING APPARATUS, METHOD OF CONTROLLING IMAGE PROCESSING APPARATUS, AND IMAGING APPARATUS

BACKGROUND OF THE INVENTION

Field of the Invention

The present invention relates to technology for controlling recording of an image and depth distribution information.

Description of the Related Art

There is technology for selecting a user-desired image from among continuously acquired moving images and acquiring one still image suitable for a user's preference in an operation of performing various types of image processing ex post facto. In Japanese Patent Laid-Open No. 2011-166391, technology for determining whether or not an object is in a predetermined state with respect to continuously captured images and relatively increasing recording quality of an image in the predetermined state is disclosed. Also, in Japanese Patent Laid-Open No. 2007-189665, technology for acquiring a high-definition image without performing frame compression if the photographing mode has been changed to a super-resolution mode is disclosed. Also, as in Japanese Patent Laid-Open No. 2015-119416, technology for adjusting a blur of a captured image in image processing by generating distance distribution information as additional information in addition to the captured image has been disclosed.

SUMMARY OF THE INVENTION

An objective of the present invention is to provide an image processing apparatus capable of acquiring the captured image and the additional information as described above and performing image recording having high convenience while minimizing a recorded amount.

An apparatus of an embodiment of the present invention is an image processing apparatus including a recording unit configured to acquire a plurality of image data and record the plurality of image data in a recording medium, the image processing apparatus including: an acquisition unit configured to acquire depth distribution information of an object corresponding to image data; and a control unit configured to perform a process of recording the plurality of image data by performing switching between a first mode in which the recording unit records the image data and the depth distribution information corresponding to the image data in the recording medium and a second mode in which the recording unit records the image data in the recording medium without recording the depth distribution information.

Further features of the present invention will become apparent from the following description of exemplary embodiments with reference to the attached drawings.

BRIEF DESCRIPTION OF THE DRAWINGS

FIG. 9 is a flowchart of a background image blurring process in the first embodiment.

FIG. 10 is a diagram illustrating a screen example for notifying that a process of blurring a background image is possible.

DESCRIPTION OF THE EMBODIMENTS

Hereinafter, embodiments of the present invention will be described with reference to the drawings. In the embodiments, an image processing apparatus for performing image processing according to a high-performance region extraction process later in response to an instruction of a user will be described.

First Embodiment

As in the above-described blur adjustment, distance distribution information is used in various types of image processing. There are a process of extracting a contour of an object, a background blurring process of electronically blurring a background, region-specific gradation processing for obtaining a compressed image in a high-quality dynamic range by separately performing a gradation correction process on a main object and a region outside the main object, etc. Also, in the region-specific gradation processing, it is also necessary to record a RAW image before image processing.

On the other hand, there is a problem in that a recorded amount is significantly large and a burden on a user increases in a type in which a distance map or data of the RAW image is recorded to perform the above-described image processing on all frames of captured images. Accordingly, it is important to minimize a necessary data amount even when additional information for post-processing is acquired.

Therefore, the present embodiment is characterized in that an image processing apparatus capable of performing control through switching between a mode in which depth distribution information serving as additional information with respect to a plurality of captured images is recorded and a mode in which no depth distribution information is recorded is provided.

Figure 1:
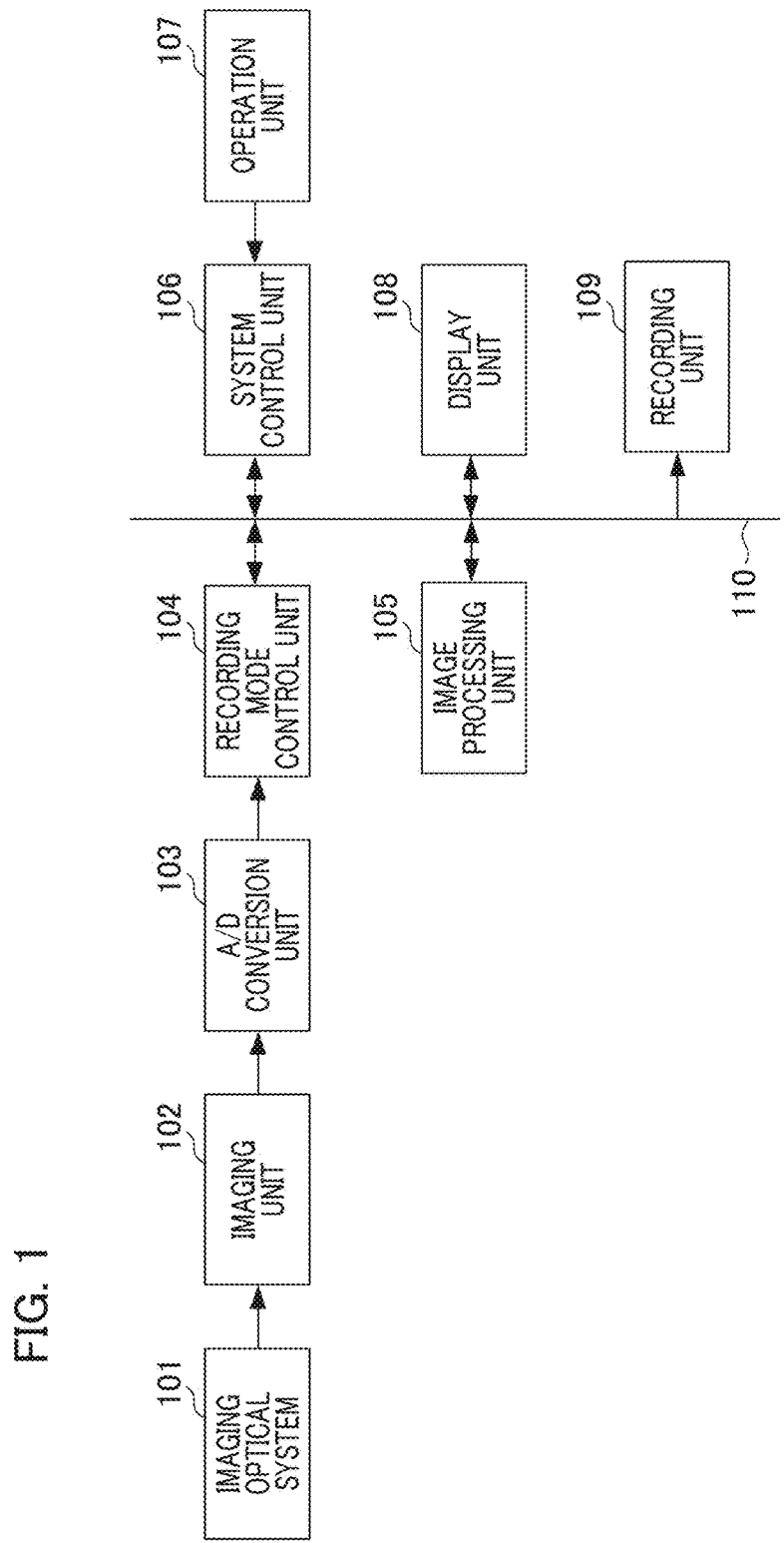
FIG. 1 is a block diagram illustrating a configuration of an imaging apparatus according to a first embodiment of the present invention.

In the first embodiment of the present invention, a case in which a background image blurring process is performed on any frame selected by a user later with respect to continuous images of a plurality of recorded frames in the image processing apparatus will be assumed and described. FIG. 1 is a block diagram illustrating a configuration capable of being applied to an imaging apparatus as an example of the image processing apparatus of the present embodiment.

An imaging optical system 101 includes a lens group such as a zoom lens and a focus lens, an aperture adjustment apparatus, and a shutter apparatus. The imaging optical system 101 adjusts a magnification, a focus position, and a light amount of an object image reaching an imaging unit 102. The imaging unit 102 includes a charge-coupled device (CCD) image sensor, a complementary metal-oxide-semiconductor (CMOS) image sensor, or the like and converts a light beam from an object passing through the imaging optical system 101 into an electrical signal according to photoelectric conversion. An analog-to-digital (A/D) conversion unit 103 converts an input analog electrical signal into a digital image signal.

A recording mode control unit 104 has a plurality of recording modes and controls an information amount of an image to be recorded in a recording unit 109. An image processing unit 105 performs processes of various types on an image signal read from the recording unit 109 in addition to an image signal output from the A/D conversion unit 103. For example, a process such as a process of correcting distortion or noise occurring in an imaging optical system, a demosaicing process, white balance adjustment, a color conversion process, or gamma correction is performed. Also, the image processing unit 105 performs a background blurring process assumed in the present embodiment in addition to predetermined image processing. In the present embodiment, an image on which at least a part of image processing other than the process of correcting distortion or noise occurring in the imaging optical system has not been performed in image processing by the above-described image processing unit 105 is referred to as a RAW image. An example in which the image processing unit 105 performs a reproduction process in the present embodiment will be described, but a reproduction processing unit separate from the image processing unit 105 may be provided.

A system control unit 106 is a control center unit which generally controls an operation of the entire imaging apparatus and includes a central processing unit (CPU), a memory, etc. The system control unit 106 performs drive control of the imaging optical system 101 and the imaging unit 102, control of predetermined image processing in the image processing unit 105, etc. according to an operation instruction from the operation unit 107 issued by the user.

A display unit 108 is constituted of a liquid crystal display, an organic electro luminescence (EL) device, or the like, and displays an image according to an image signal generated by the imaging unit 102 or an image signal read from the recording unit 109. The recording unit 109 performs a process of recording the image signal in a recording medium. A recording process is performed in an encoding format for a still image (for example, JPEG or the like) and an encoding format for a moving image (for example, H.264, H.265, or the like) according to recording settings of the still image and the moving image. If each of a still image and a moving image is set to be recorded as a RAW image before image processing, deterioration of image quality is less than when image data after image processing such as decompression or lossless compression is recorded and compression and recording are performed at a low compression rate. A recording medium is, for example, a memory card equipped with a semiconductor memory or an information recording medium using a package storing a rotary recording member such as a magneto-optical disk or the like. The recording medium is removable from the imaging apparatus.

A bus 110 is used to transmit and receive signals among the recording mode control unit 104, the image processing unit 105, the system control unit 106, the display unit 108, and the recording unit 109.

Hereinafter, a flow of a process in the present embodiment will be described on the basis of the recording mode control unit 104 and the image processing unit 105. The recording mode control unit 104 is a characteristic processing block in the present embodiment. Also, the image processing unit 105 is a processing block for performing a process of blurring a background image in response to an operation instruction after photographing.

An operation of the recording mode control unit 104 will be described with reference to FIGS. 2 and 3.

Figure 2:
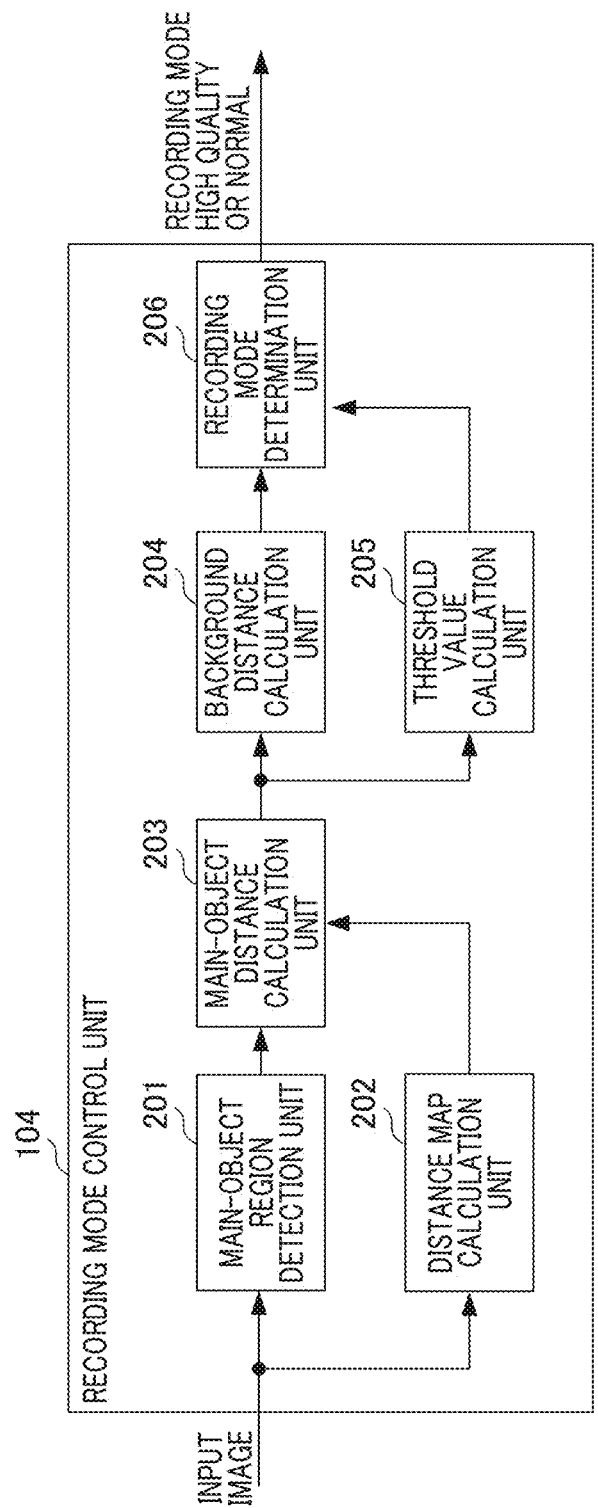
FIG. 2 is a block diagram of a recording mode control unit in the first embodiment.

FIG. 2 is a block diagram of the recording mode control unit 104. A main-object region detection unit 201 acquires data of an input image and detects a main-object region. The main-object region is, for example, an image region of an object selected from a plurality of objects. A distance map calculation unit 202 acquires data of an input image to calculate a distance map (depth distribution information). A main-object distance calculation unit 203 acquires information of the main-object region detected by the main-object region detection unit 201 and a distance map calculated by the distance map calculation unit 202 to calculate a main-object distance. The main-object distance is a distance from the imaging apparatus to the main object. A background distance calculation unit 204 calculates a background distance from information of a background region and the distance map. The background region is a region outside the main object and the background distance is a distance from the imaging apparatus to the background. A threshold value calculation unit 205 acquires the main-object distance to calculate a threshold value for a distance difference between the main object and the background. A recording mode determination unit 206 acquires the main-object distance, the background distance, and the threshold value, compares a difference between the main-object distance and the background distance with the threshold value, and performs a process of determining a recording mode. Recording modes include at least a first mode in which image data and distance information are recorded and a second mode in which image data is recorded. Control for performing switching between the first and second modes during recording of each frame with respect to a moving image in which image data acquired through imaging is designated as each frame will be described in the present embodiment, but the control is not limited thereto. For example, an embodiment in which switching between the first and second modes is performed in capturing a still image is also included in the present invention. That is, it is only necessary to perform control for performing switching between the first mode the second mode with respect to a plurality of acquired image data. Details of a process of each unit will be described below.

Figure 3:
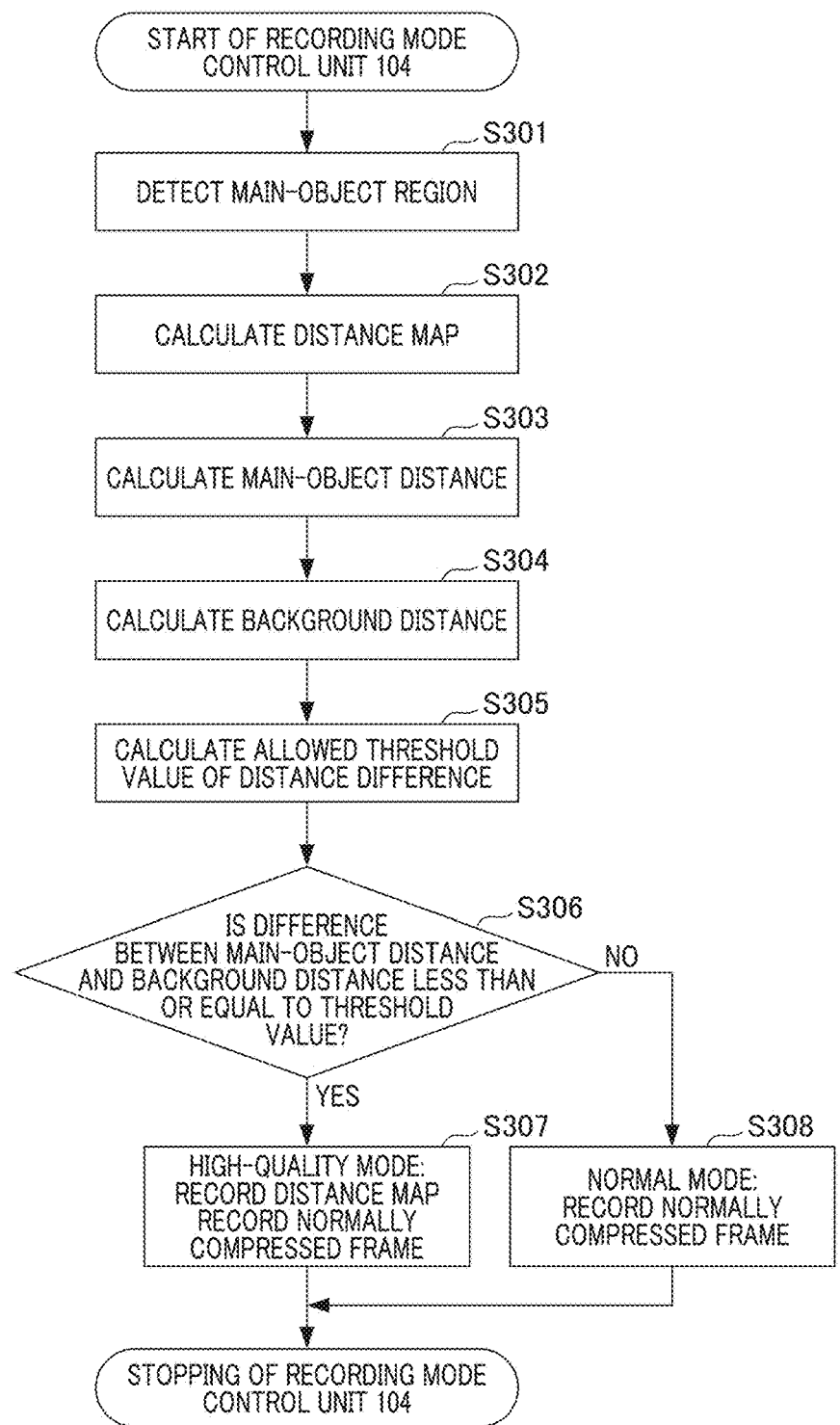
FIG. 3 is a flowchart illustrating a process of the recording mode control unit in the first embodiment.

FIG. 3 is a flowchart illustrating a process of the recording mode control unit 104. A case in which a moving image is being acquired in the present flowchart is assumed and frame images are assumed to be continuously input at a predetermined frame rate during a period from a time of a photographing start instruction from the user to a time of a photographing operation end instruction.

Figure 4:
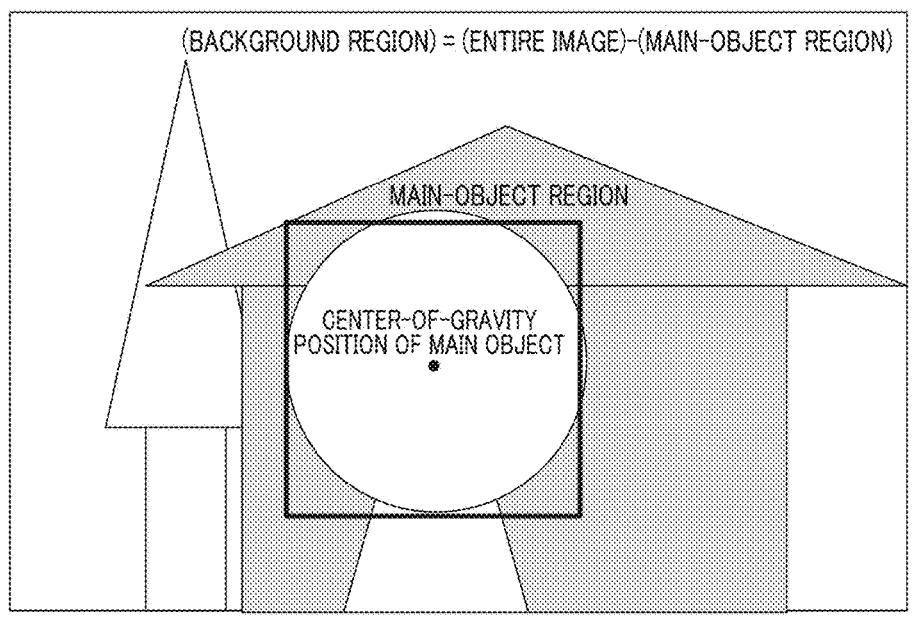
FIG. 4 is an explanatory diagram illustrating an example of a main-object region detection result.

First, the main-object region detection unit 201 detects a main-object region in S301. A specific example will be described with reference to FIG. 4. FIG. 4 illustrates an example of the detected main-object region, wherein the main-object region is detected using a face detection frame. Additionally, a main-object region is assumed to be detected according to general physical object detection if the main object is not a person, and the present invention is not limited to a specific detection method. Also, as illustrated in FIG. 4, a region which is not the main-object region is defined as a background region in a region of the entire image.

Next, the distance map calculation unit 202 calculates a distance map in S302. As a method of calculating the distance map, for example, there is a method of generating a parallax image by performing pupil division on light from an object, calculating a parallax amount, and acquiring depth distribution information of the object as disclosed in Japanese Patent Laid-Open No. 2015-119416. The depth distribution information of the object includes data in which a distance value of a distance (an object distance) from a camera serving as an imaging means to the object is indicated by an absolute value and data indicating a relative distance relationship (a depth of an image) in the image data (a distribution of parallax amounts, a distribution of defocus amounts, etc.)

In relation to the depth distribution information, there are various embodiments for information corresponding to a degree of depth in a depth direction of each object within a captured image. That is, it is only necessary for information indicated by data corresponding to the depth of the object to be information directly indicating an object distance from the imaging apparatus to the object within the image or indicating a relative relationship of a distance (an object distance) or a depth of the object within the image. For example, control for changing a focusing position with respect to the imaging unit 102 is performed and a plurality of captured image data obtained by photographing are acquired. It is possible to acquire depth distribution information from a focusing region of the captured image data and focusing position information of the captured image data. Additionally, if an imaging element of the imaging unit 102 has a pupil division type pixel component, it is possible to acquire the depth distribution information for each pixel from a phase difference between a pair of image signals. Specifically, the imaging element converts a pair of light beams, which pass through different pupil portion regions of an imaging optical system and are formed as optical images, into electrical signals and outputs paired image data from a plurality of photoelectric conversion units. An image shift amount of each region is calculated according to a calculation of a correlation between the paired image data and an image shift map indicating a distribution of image shift amounts. Alternatively, further, the image shift amount may be converted into a defocus amount and a defocus map indicating a distribution of defocus amounts (a distribution on a two-dimensional plane of the captured image) may be generated. If the defocus amount is converted into an object distance on the basis of conditions of the imaging optical system or the imaging element, distance map data indicating a distribution of object distances is obtained. It is possible to acquire image shift map data, defocus map data or distance map data of an object distance obtained by conversion from the defocus amount.

Also, the object distance from the imaging apparatus to the object within the image may be directly acquired using a time of flight (TOF) method of measuring a delay time until reflected light is received from projected light for the object and measuring a distance to the object. In the TOF method, a light projection means projects pulse light to the object (a target object), the imaging unit 102 receives the reflected light, the object distance (the distance to the target object) is measured by measuring a TOF (a delay time) of the pulse light, and the depth distribution information is acquired.

Data indicated by the distance value will be described below in the present embodiment, but each process is assumed to be performed by replacing the distance value with a parallax amount or a defocus amount if a distribution of parallax amounts or defocus amounts is used as the depth distribution information.

Figure 5A:
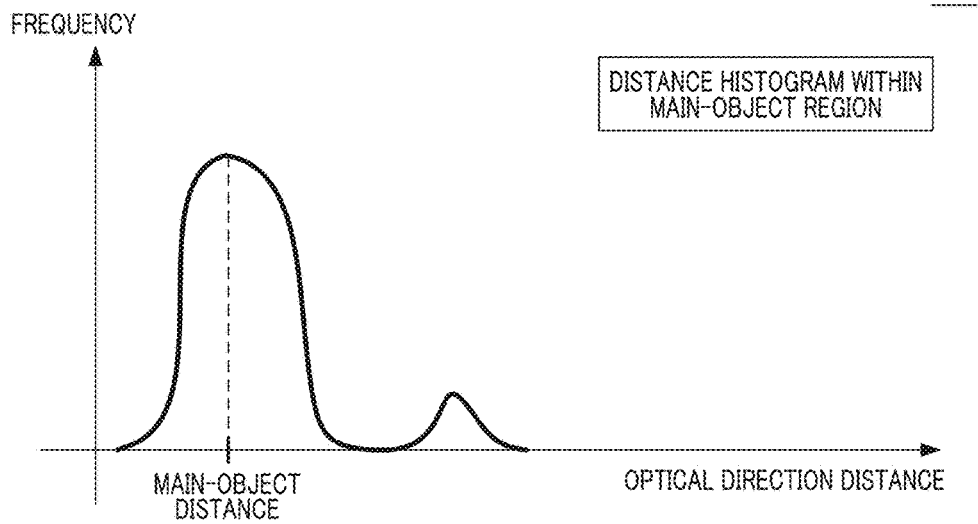
FIGS. 5A and 5B are diagrams illustrating distance histograms of a main-object region and a background region.
Figure 5B:
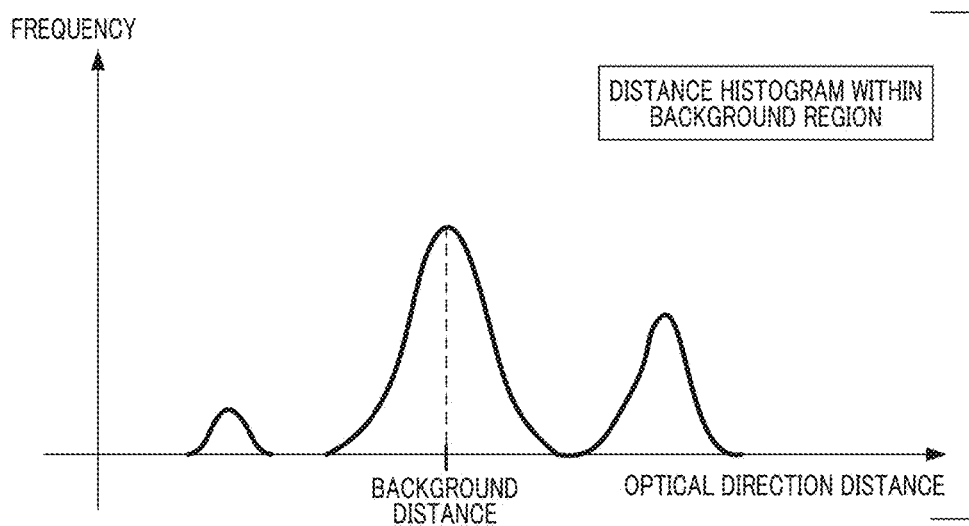

In S303, the main-object distance calculation unit 203 calculates a main-object distance (a parallax amount or a defocus amount corresponding to the main object) using the main-object region information and the distance map. In S304, the background distance calculation unit 204 calculates a background distance using the background region information and the distance map. Specific examples of the processes of S303 and S304 will be described with reference to FIGS. 5A and 5B. FIGS. 5A and 5B are diagrams illustrating a method of calculating the main-object distance and the background distance. The horizontal axis represents a distance in an optical axis direction of the imaging apparatus and the vertical axis represents a frequency of a distance histogram.

First, the main-object distance calculation unit 203 acquires a distance histogram within the main-object region illustrated in FIG. 5A and designates a distance corresponding to a peak value serving as a maximum value of the frequency as the main-object distance. In FIG. 5A, an example in which there are two peak values is illustrated. The peak values are present in addition to the main-object distance because a boundary of the main-object region is defined by a rectangular frame and therefore a part of the background image is included in the main-object region.

Next, the background distance calculation unit 204 acquires the distance histogram within the background region illustrated in FIG. 5B and designates a distance corresponding to a peak value serving as a maximum value of the frequency as the background distance. In FIG. 5B, an example in which there are three peak values is illustrated.

In S305, the threshold value calculation unit 205 calculates a threshold value for a distance difference between the main object and the background. The threshold value is determined using an optical model from the value of the main-object distance. Description will be given with reference to FIG. 6. The optical model of FIG. 6 indicates an object distance and an image distance when the imaging optical system 101 is approximated as one lens. With respect to a lens of a focus distance (denoted by f), a side on which there is a physical object (the left of the lens in FIG. 6) is defined as an object side and a side on which an image of light from the physical object is formed through the lens (the right of the lens in FIG. 6) is defined as an image plane side. Further, a focus is assumed to be aligned in the main object and the following distances are defined.

Main-object distance: Dist_Obj
Background distance: Dist_Back
Main-object image distance: Img_Obj The main-object image distance is a distance at which an image of light from the main object is formed on the image plane side. Further, a position on the image plane side at which an image of light from the main object is formed is designated as a focus plane and a displacement amount from a focus plane to a position at which an image of light of a background is formed is designated as a defocus amount def. Here, a sign of the defocus amount def is assumed to be positive in a direction away from the object plane side with respect to the lens. Accordingly, a defocus amount at a position at which an image of light of the background at a position away from the main object on the object plane is formed has a negative value. Qualitatively, as an absolute value of the defocus amount increases, a degree of dispersal of the background image in the focus plane increases and the blur of the background increases.

Figure 6:
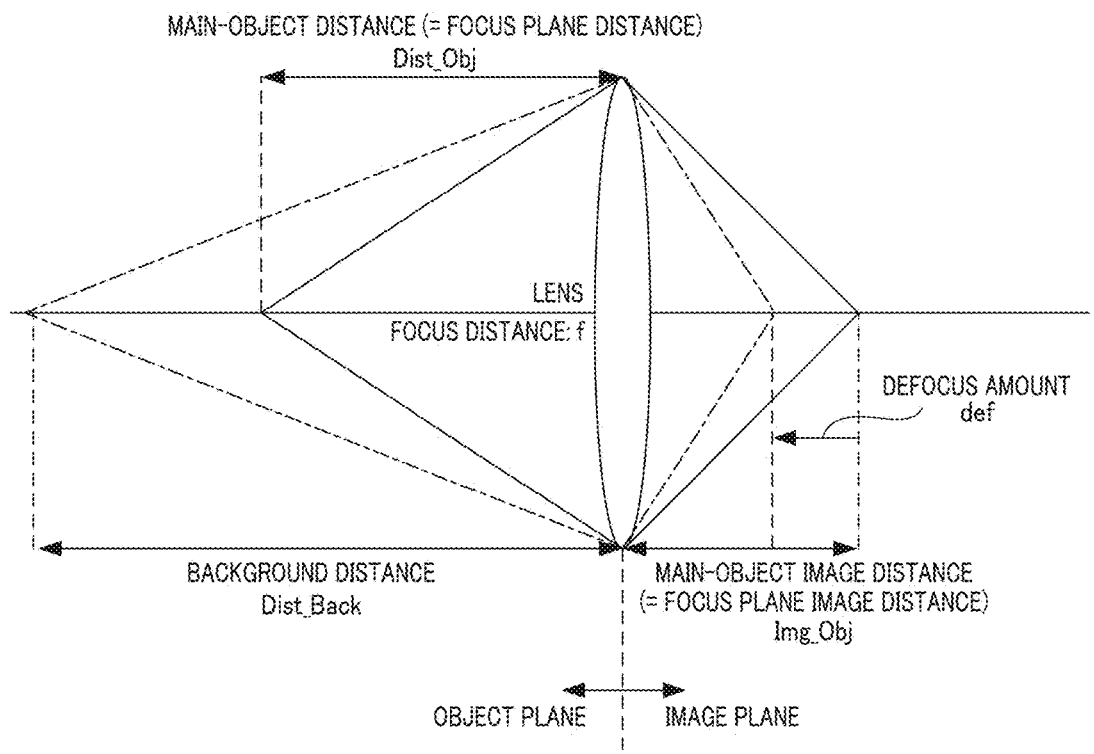
FIG. 6 is a diagram illustrating an example of an optical model indicating an object distance and an image distance.

In FIG. 6, the following Equations (1) and (2) are established according to the lens formula.

$$\frac{1}{\text{Dist\_Obj}} + \frac{1}{\text{Img\_obj}} = \frac{1}{f} \quad (1)$$

$$\frac{1}{\text{Dist\_Back}} + \frac{1}{\text{Img\_obj} + \text{def}} = \frac{1}{f} \quad (2)$$

Here, if the main-object image distance Img_obj is eliminated from Equations (1) and (2) and modification to an equation for the background distance Dist_Back is applied, the following Equation (3) is obtained.

$$\text{Dist\_Back} = \frac{\left(\frac{\text{Dist\_Obj} \times f}{\text{Dist\_Obj} - f} + \text{def}\right) \times f}{\left(\frac{\text{Dist\_Obj} \times f}{\text{Dist\_Obj} - f} + \text{def}\right) - f} \quad (3)$$

From Equation (3), it can be seen that the background distance Dist_Back is a function of the defocus amount def if the main-object distance Dist_Obj and the focus distance f are uniquely defined. Accordingly, an example in which the object distance is mainly calculated as the distance map in the present embodiment is shown, but an objective is also achieved by the defocus amount and the parallax amount.

Figure 7:
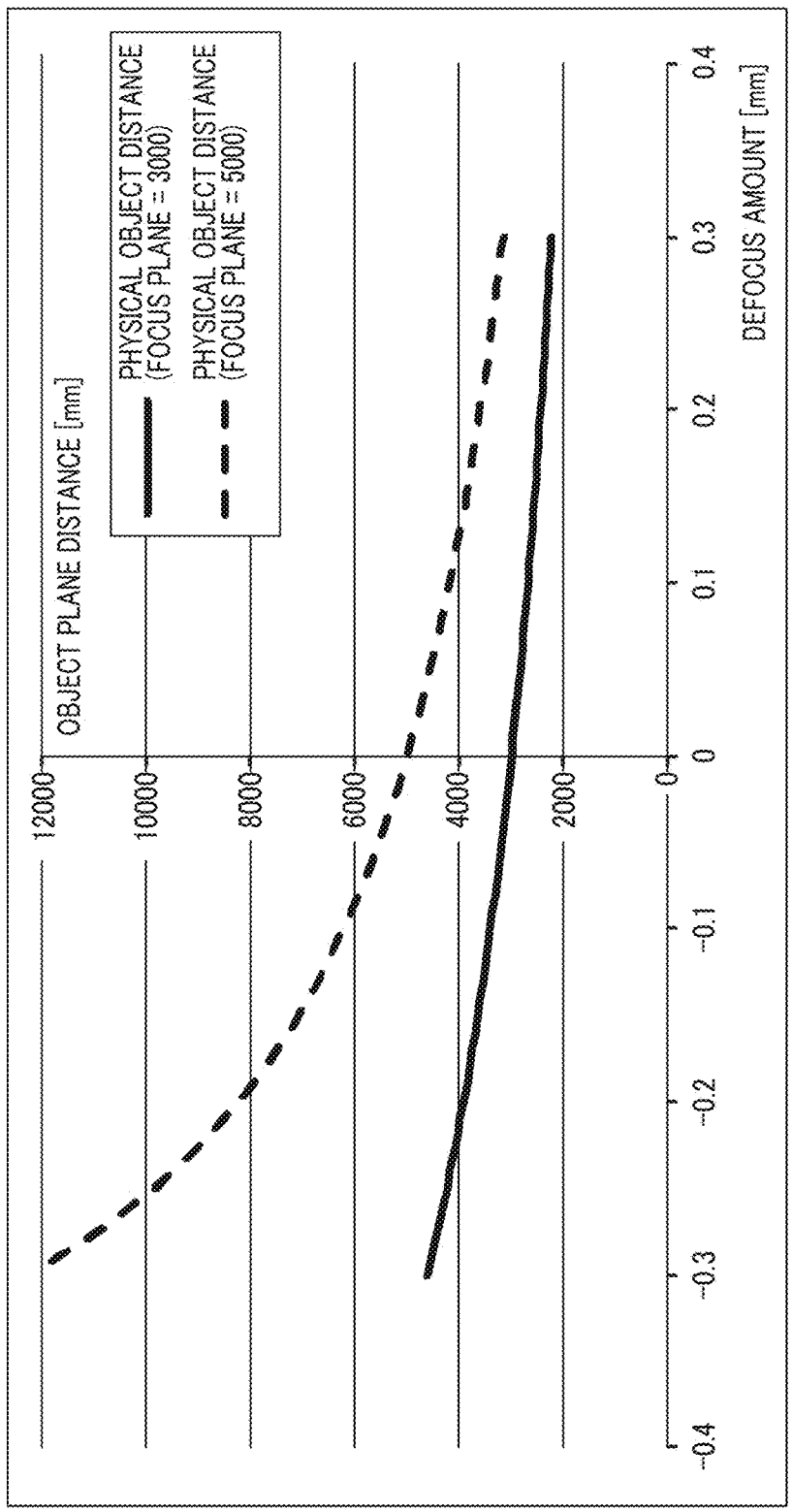
FIG. 7 is a diagram illustrating a relationship between a defocus amount and an object plane distance in a graph.

FIG. 7 is a graph illustrating a relationship between the defocus amount (the horizontal axis) and the object plane distance (the vertical axis) created on the basis of Equation (3). Two examples in which the focus distance is designated as 50 mm and the main-object distance Dist_obj is designated as 3 m (3000 mm) and 5 m (5000 mm) are shown. Because the focus is assumed to be aligned in the main object, the defocus amount becomes 0 when the physical-object distance is equivalent to Dist_obj. When the allowed defocus amount in which the background is regarded to be sufficiently blurred is −0.2 mm, a corresponding physical-object distance is about 3911 mm if Dist_obj=3 m. Accordingly, a threshold value for the distance difference between the object and the background becomes |3911−3000|=911 mm and is calculated as 90 cm.

The above is description of a process to be performed by the threshold value calculation unit 205 in S305.

Next, in S306, the recording mode determination unit 206 compares the difference between the main-object distance and the background distance with the threshold value acquired from the threshold value calculation unit 205. If the difference between the main-object distance and the background distance is less than or equal to the threshold value, the recording mode determination unit 206 determines that the blur of the background image is not sufficient and an electronic blurring process is likely to be necessary later and the process proceeds to S307 to perform a recording process in a high-quality mode which is the first mode. A process of recording a distance map in addition to data of a normally compressed frame is executed in the high-quality mode. The process of blurring the background using information recorded in the high-quality mode will be described below. On the other hand, if the difference between the main-object distance and the background distance is greater than the threshold value, the recording mode determination unit 206 determines that the blur of the background image is sufficient. That is, the recording mode determination unit 206 determines that the electronic blurring process is unnecessary and the process proceeds to S308 to perform the recording process in the normal mode which is the second mode. A process of recording only data of a normally compressed frame is executed in the normal mode. Also, predetermined signal processing according to a frame compression process and a development process is assumed to be performed within the image processing unit 105. A process in the recording mode control unit 104 is performed during photographing. Also, an image recorded in the high-quality mode is not limited to a normally compressed frame, and may be a RAW image before image processing. Here, a compression process may be performed on the RAW image in a lossless compression scheme during recording.

Next, the background image blurring process to be performed according to an instruction of a user after recording will be described. The present process is mainly performed by the image processing unit 105, but an operation unit 107 which receives the instruction of the user and a system control unit 106 are also related thereto. Because the present process is performed after recording, the present process is referred to as a "post-blurring process" hereinafter. The post-blurring process will be described with reference to FIGS. 8 and 9.

Figure 8:
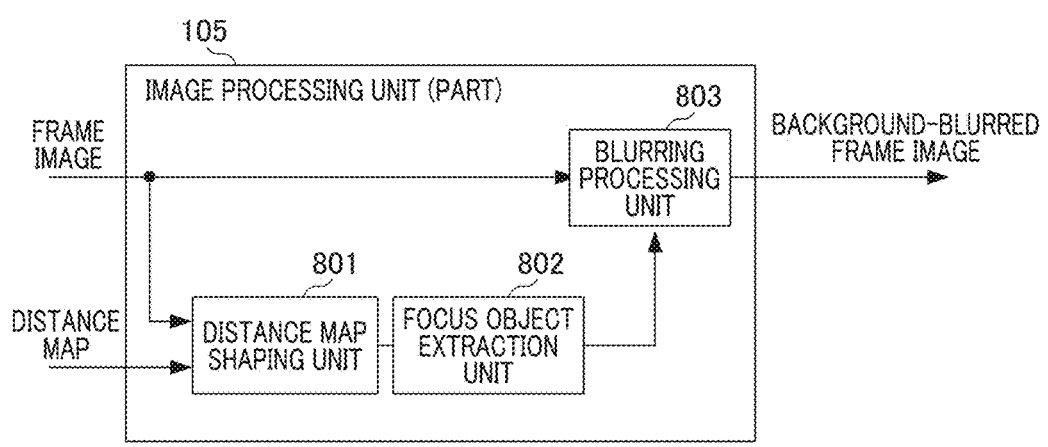
FIG. 8 is a block diagram of an image processing unit in the first embodiment.

FIG. 8 is a processing block diagram of the image processing unit 105 related to the post-blurring process. A distance map shaping unit 801 performs a distance map shaping process. The distance map shaping process will be described below. A focus object extraction unit 802 extracts an image of a focus object. The focus object is a main object in which a focus is aligned. A blurring processing unit 803 performs a background image blurring process and outputs frame image data after the process. Details of the process of each unit will be described below.

FIG. 9 is a flowchart of the post-blurring process.

First, in S901, the imaging apparatus receives an instruction of the background image blurring process from the user. Because a frame for which the post-blurring process is possible is only a frame recorded in the high-quality mode, it is necessary to notify the user whether or not the frame is a frame capable of being processed. FIG. 10 illustrates a display example when the display unit 108 notifies the user that the post-blurring process is possible. Display and input processes for asking for an instruction of whether or not to perform the background image blurring process are performed. If the user has selected an operation of performing the background image blurring process during moving-image reproduction, the system control unit 106 receives an operation instruction from the operation unit 107 and commands the image processing unit 105 to perform a process subsequent to S902.

Figure 11A:
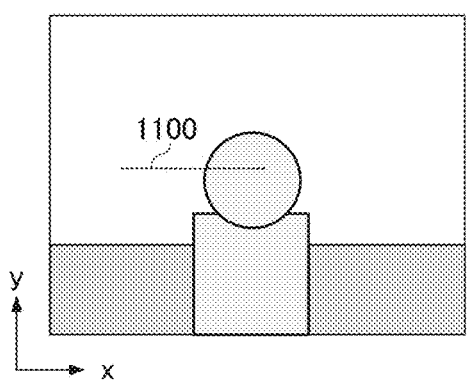
FIGS. 11A to 11E are diagrams illustrating a process of a distance map shaping unit.

In S902, the distance map shaping unit 801 acquires data of the frame image and the distance map and performs the distance map shaping process. FIG. 11A to 11E are diagram illustrating the distance map shaping process. FIG. 11A illustrates an input frame image, FIG. 11B illustrates an input distance map before the shaping process, and FIG. 11C illustrates an output distance map after the shaping process.

The precision of an object contour of the input distance map illustrated in FIG. 11B may be degraded with respect to the object contour in the input frame image illustrated in FIG. 11A. This is because of an influence of the perspective conflict of an object boundary part during a distance calculation, the calculation of a distance map performed by reducing the resolution for the frame image, etc. Precise contour extraction is necessary in the background image blurring process. Thus, a process of adjusting the object contour of the distance map to the object contour of the frame image is necessary. This process is referred to as a shaping process. Of course, the distance map after the shaping process is highly versatile because it can also be utilized in a process in which the distance map is necessary in addition to the background image blurring process.

The shaping process is performed according to a bilateral filtering process. In the bilateral filtering process, a filtering result of a target pixel position p (denoted by Jp) is expressed by the following Equation (4) using an image for shaping as a frame image (see FIG. 11A).

$$Jp = (1/Kp)\Sigma_\Omega I1q \cdot f(|p-q|) \cdot g(|I2p-I2q|) \quad (4)$$

Meanings of symbols of Equations (4) are as follows.

q: Peripheral pixel position $\Omega$: Summation target region around target pixel position p $\Sigma$: Summation of range of $q \in \Omega$ I1q: Distance map signal value at peripheral pixel position q f(|p−q|): Gaussian function around target pixel position p I2p: Pixel value of image for shaping at target pixel position p I2q: Pixel value of image for shaping at peripheral pixel position q g(|I2p−I2q|): Gaussian function around pixel value I2p of image for shaping Kp: Normalized coefficient and sum value of weight of f·g In Equation (4), the f value is larger when the target pixel position p is closer to the peripheral pixel position q. When a difference between I2p of the target pixel position p and I2q of the peripheral pixel position q is smaller, that is, when pixel values of the target pixel and the peripheral pixel are closer to each other in an image for shaping, a weight of g of the peripheral pixel (a smoothing weight) is larger. An output obtained by performing weighted addition on a signal value I1q of the input distance map in the weight of f*g becomes a signal value Jp of the output distance map after shaping.

Figure 11D:
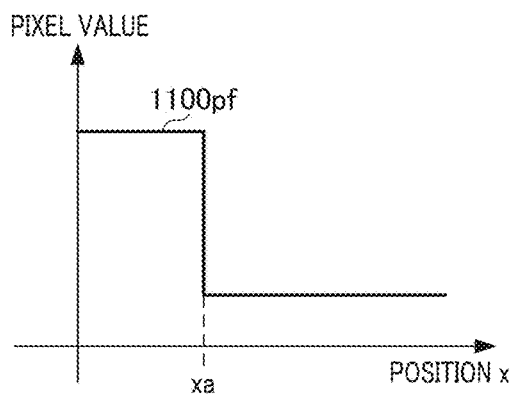
Figure 11B:
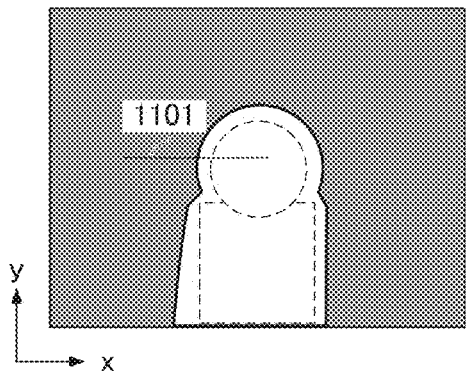
Figure 11E:
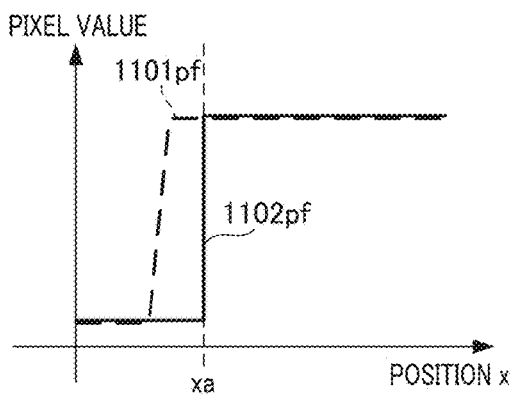
Figure 11C:
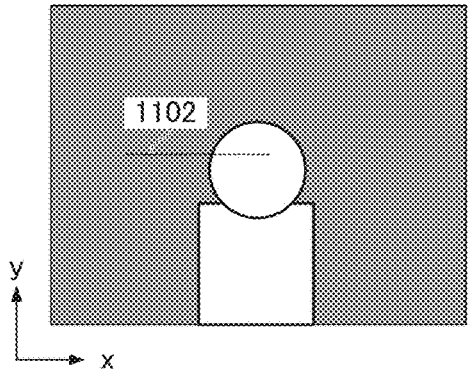

FIG. 11D illustrates a profile 1100pf at a position x on the frame image of FIG. 11A. An acquisition position of the profile 1100pf is indicated by a line 1100 on FIG. 11A. The profile 1100pf has a step shape which changes at a position xa. Also, FIG. 11E illustrates a profile at a position x of the distance maps of FIGS. 11B and 11C. The acquisition position of a profile 1101pf is indicated by a line 1101 on FIG. 11B and the acquisition position of a profile 1102pf is indicated by a line 1102 on FIG. 11C. The position of the line 1101 is the same as the position of the line 1102.

In the input distance map illustrated in FIG. 11B, the signal value indicating the distance of the object is outside the contour of the object image. A change in the profile 1101pf indicated by a dotted line in FIG. 11E is shifted from the position xa at which the profile 1100pf of FIG. 11D changes. The shaping process is executed by a bilateral filter and a profile 1102pf corresponding to the distance map after shaping of FIG. 11C is obtained. A position at which the profile 1102pf changes matches a position xa at which the profile 1100pf of FIG. 11D changes and a shape according to the contour of the object image is given. That is, the profile 1102pf has a step shape which significantly changes at the position xa.

Figure 12A:
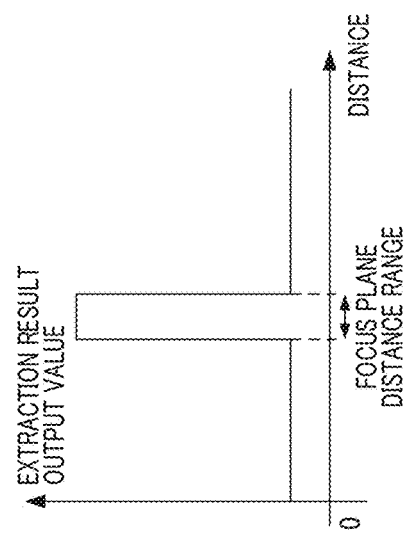
FIGS. 12A to 12D are diagrams illustrating a process of a focus object extraction unit.
Figure 12B:
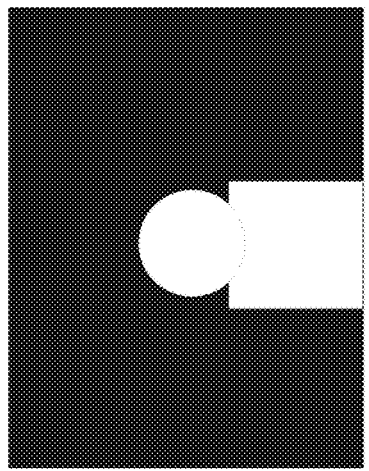
Figure 12C:
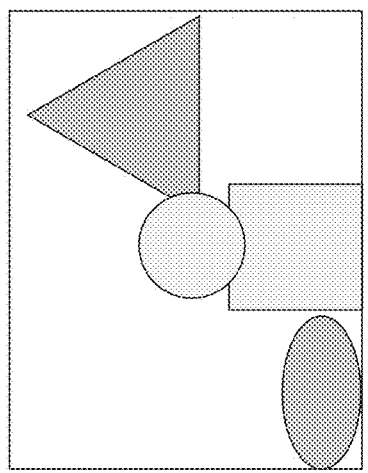
Figure 12D:
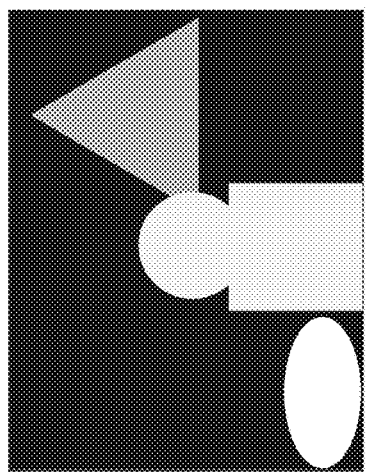

In S903 of FIG. 9, the focus object extraction unit 802 extracts a focus object. Specific description will be given with reference to FIGS. 12A to 12D. FIG. 12A illustrates an input frame image and FIG. 12B illustrates a distance map after shaping. FIG. 12C illustrates an extraction characteristic and FIG. 12D illustrates an extraction result of the focus object.

The extraction characteristic of FIG. 12C is applied to the distance map after the shaping illustrated in FIG. 12B. The horizontal axis of FIG. 12C represents a distance of the object and the vertical axis represents an output value of the extraction result. The extraction characteristic is a characteristic in which a maximum value is output only at a distance within a predetermined focus plane distance range and zero or a minimum value is output at other distances. The extraction result output according to the application of the extraction characteristic is illustrated in FIG. 12D. Only a main object in which the focus is aligned is extracted.

Figure 13A:
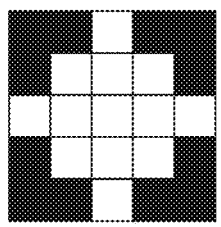
FIGS. 13A to 13C are diagrams illustrating a blurring process.
Figure 13B:
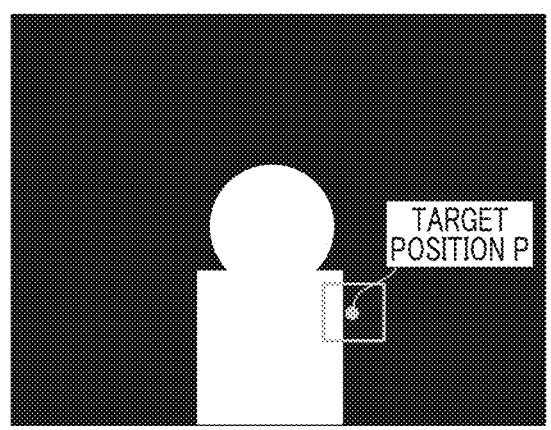
Figure 13C:
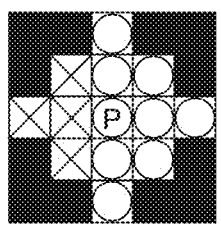

In S904 of FIG. 9, the blurring processing unit 803 performs a background image blurring process. The blurring process will be described with reference to FIGS. 13A to 13C. FIG. 13A illustrates a shape example of a kernel of a blurring filter and FIG. 13B illustrates a focus plane extraction image. FIG. 13C illustrates a blurring filter for a target position.

In order to simulate a round blur caused by the lens, the shape of the kernel of the blurring filter is substantially circular as illustrated in FIG. 13A and a filter weight (a weighting coefficient value) is fixed. In the present embodiment, a filter size is 5×5. The blurring filter is applied to each image of input frame images. At this time, the blurring processing unit 803 refers to a focus plane extraction image and controls the blurring process such that it is performed only on the background part. FIG. 13B illustrates a case in which a target position P is a position on the right of the object. In this case, the blurring filter performs a filtering calculation with respect to a position illustrated by a symbol o in FIG. 13C. A position illustrated by a symbol x is a position belonging to an image region of the focus object. If these positions are included in a target of the filtering calculation, a contour part is mixed in and image quality is likely to be degraded. Thus, control is performed so that the filtering process is performed only on a background part. According to the above process, an image in which the blurring process has been performed on only the background region other than the focus object is obtained.

In S905 of FIG. 9, post-adjustment is executed. The present process is a process of adjusting an intensity of blurring if a result of confirming whether or not the intensity of blurring is suitable for the user's preference indicates that the intensity of blurring is not suitable for the user's preference. Thereby, it is possible to obtain the blurred image having a degree desired by the user. It is possible to adjust the intensity of blurring by changing the number of TAPs of a filter kernel of FIG. 13A. The post-blurring process to be executed by the image processing unit 105 is performed in response to an instruction of the user after photographing. Finally, image data generated by the image processing unit 105 is recorded on the recording medium by the recording unit 109.

In the present embodiment, whether or not to simultaneously acquire additional information for region extraction is dynamically switched according to a distance difference between the main object and the background. Thus, it is possible to reduce a burden on the user due to a large record amount and pre-acquire information for the post-blurring process. It is possible to perform image recording having much benefit for the user while minimizing a recorded amount by recording highly precise region extraction information with respect to only frames which are likely to be post-processed. Here, although only a captured image is recorded in a normal mode when the distance difference between the main object and the background is large in the present embodiment, a method of dealing with the distance difference between the main object and the background is not limited thereto. If the distance difference between the main object and the background is greater than or equal to the threshold value, recording is performed in the high-quality mode because the background blurring process is desired to be performed in order to further emphasize the distance difference.

In the present embodiment, the presence/absence of acquisition of additional information is determined from a result of comparing the distance difference with the threshold value on the basis of the distance difference between the main object and the background. The present invention is not limited thereto, and, for example, depth information may be acquired from the F value and the depth information may be designated as one element of the determination. Also, as the distance map calculation method in the present embodiment, the distance may be calculated from the parallax of a pupil division image. The present invention is not limited thereto and, for example, the distance may be acquired using a contrast auto focus (AF) evaluation value or the like. These points are also true for embodiments to be described below.

Second Embodiment

Next, the second embodiment of the present invention will be described. In the first embodiment, a case in which the post-blurring process is performed on the recorded image is assumed. In the second embodiment, for example, a case in which a region-specific gradation correction process is performed later on a frame image in which a main object is darkened by backlight is assumed. If the main object darkened by the backlight and a background region outside the main object have been processed according to the same gradation conversion characteristic, a dark part of the background is extremely bright and an unnatural image is caused. If the gradation correction is performed according to a region, this means that unnaturalness is minimized by correcting the main-object region and the background region within the image according to separate gradation characteristics. On the other hand, an advanced region extraction process is required in this process.

As compared with the first embodiment, the process in the present embodiment is different from the operation of the recording mode control unit 104 and the operation of the image processing unit 105 related to post-processing. Hereinafter, parts of processing different from the first embodiment will be mainly described and components similar to those of the first embodiment are denoted by the above-used reference signs and detailed description thereof will be omitted. The omission of the description is true for the following embodiments.

Figure 14:
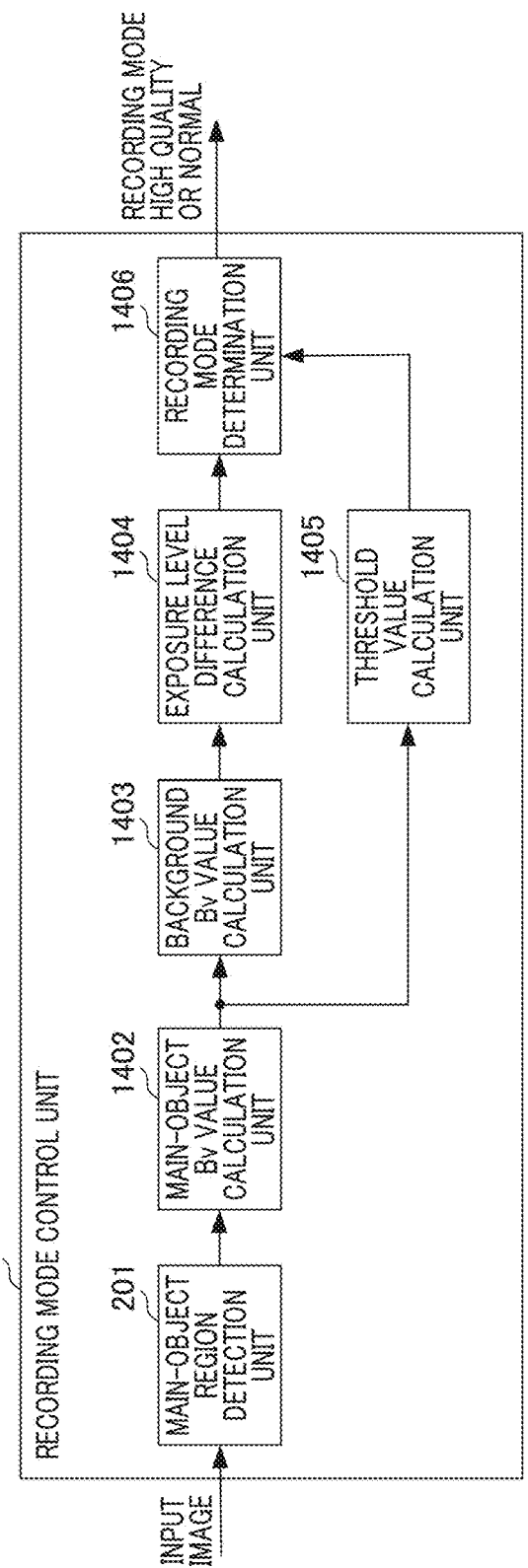
FIG. 14 is a block diagram of a recording mode control unit in a second embodiment of the present invention.

An operation of the recording mode control unit 104 will be described with reference to FIGS. 14 and 15. FIG. 14 is a processing block diagram of the recording mode control unit 104 in the second embodiment. A difference from the configuration illustrated in FIG. 2 is as follows.

A main-object Bv value calculation unit 1402 acquires information of a main-object region from the main-object region detection unit 201 and calculates a Bv value of a main object. The Bv value is an exposure value indicating a luminance difference for a target luminance value of a target region. A background Bv value calculation unit 1403 acquires information of a background region and calculates the Bv value of the background. An exposure level difference calculation unit 1404 acquires Bv values of the main object and the background and calculates an exposure level difference between the main object and the background. The threshold value calculation unit 1405 calculates a threshold value for the exposure level difference from the Bv value of the main object. A recording mode determination unit 1406 acquires the exposure level difference between the main object and the background calculated by the exposure level difference calculation unit 1404 and the threshold value calculated by the threshold value calculation unit 1405. The recording mode determination unit 1406 compares the exposure level difference with the threshold value and determines the recording mode. Details of processes of the units will be described below.

Figure 15:
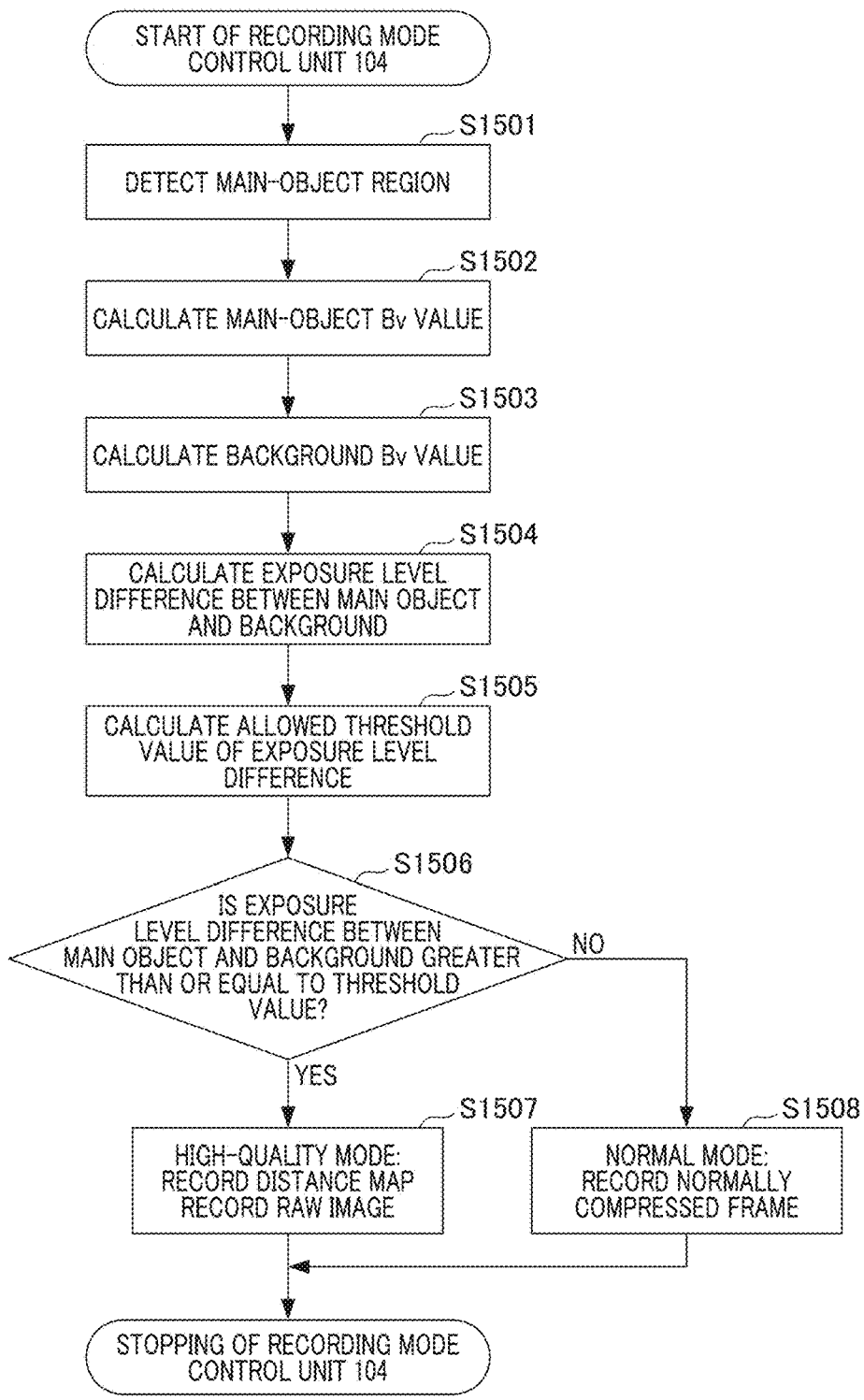
FIG. 15 is a flowchart illustrating a process of the recording mode control unit in the second embodiment.

FIG. 15 is a flowchart illustrating a process of the recording mode control unit 104.

First, in S1501, the main-object region detection unit 201 detects a main-object region within an image. In the next S1502, the main-object Bv value calculation unit 1402 calculates the Bv value of the main object. If the Bv value of the main object is denoted by Bv_obj, this is calculated by the following Equation (5).

$$Bv\_obj = \log_2(Y\_obj/Y\_obj\_target) \quad (5)$$

In Equation (5), $\log_2$ is a logarithmic function having a base of 2. Y_obj is a representative luminance value of the main object and is calculated as an average value of luminance values of the main-object region. Also, Y_obj_target is a target luminance value of the main-object region. The target luminance value is a luminance value regarded as appropriate exposure and is a predetermined value. The target luminance value may be changed according to whether or not the main object is a person. According to Equation (5), the Bv value is smaller when the brightness of the main object is darker. For example, if the representative luminance value of the main object is ½ of the target luminance value, the Bv value becomes −1. If the representative luminance value of the main object is twice the target luminance value, the Bv value becomes +1.

In S1503, the background Bv value calculation unit 1403 calculates the Bv value of the background. If the background Bv valued is denoted by Bv_back, this is represented by the following Equation (6)

$$Bv\_back = \log_2(Y\_back/Y\_back\_target) \quad (6)$$

In Equation (6), Y_back is a representative luminance value of the background and is calculated as an average value of luminance values of the background region or the like. Also, Y_back_target is a target luminance value of the background region.

In the next S1504, the exposure level difference calculation unit 1404 calculates an exposure level difference (denoted by delta_Bv) between the main-object region and the background region according to the following Equation (7).

$$delta\_Bv = |Bv\_obj - Bv\_back| \quad (7)$$

As can be seen from Equations (5) to (7), when the background is brighter and the main object is darker or vice versa, that is, when a dynamic range (D range) in the case of focusing on the main object is wider, a value of the exposure level difference delta_Bv is larger. Also, when the D range is narrower, the value of delta_Bv is smaller. In the present embodiment, the exposure level difference is used as an evaluation value indicating the D range of the frame.

Figure 16:
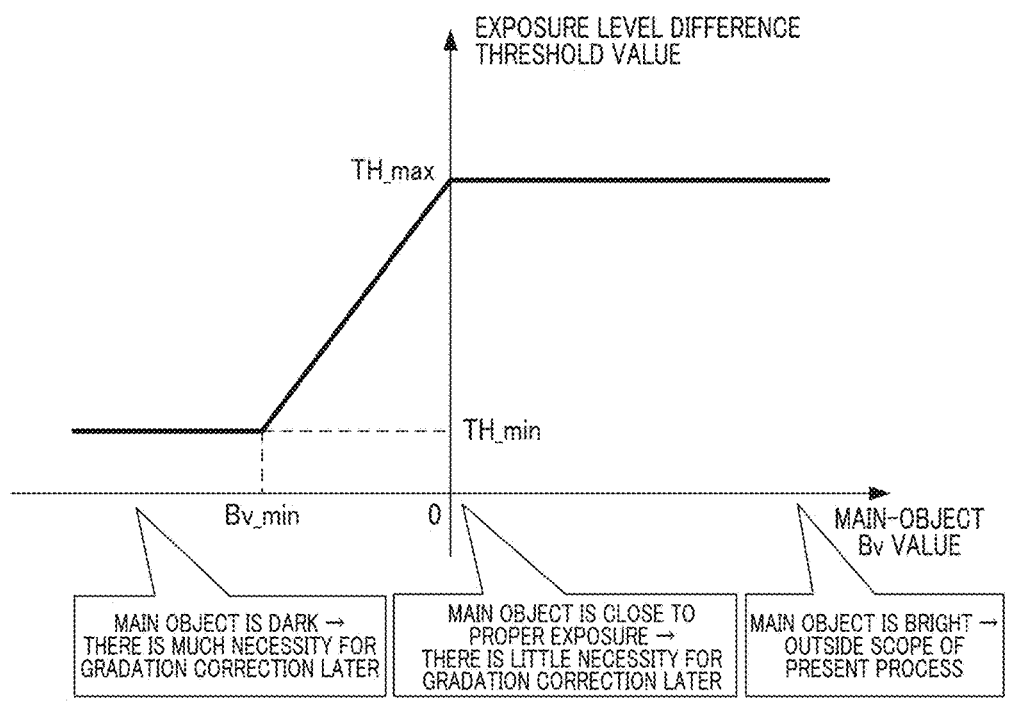
FIG. 16 is a diagram illustrating a process of a threshold value calculation unit.

Next, in S1505, the threshold value calculation unit 1405 calculates a threshold value for the exposure level difference from the main object Bv. A threshold value calculation example illustrated in FIG. 16 will be described. In the graph illustrated in FIG. 16, the horizontal axis represents a main object Bv and the vertical axis represents an exposure level difference threshold value. In the example of FIG. 16, a threshold value corresponding to Bv_min is TH_min and a threshold value is TH_max if the main-object Bv value is greater than or equal to zero. An example in which linear interpolation is performed in a first-order equation in a section from Bv_min to zero is shown, but an interpolation process of a higher order which is greater than or equal to a second order may be performed.

As illustrated in FIG. 16, if the main-object Bv value is a negative value, that is, if the main object is darker than in appropriate exposure, the gradation correction process is likely to be qualitatively performed later. Accordingly, the threshold value for the exposure level difference is set to be small. On the other hand, the main object is close to the appropriate exposure if the main-object Bv value is close to zero. Accordingly, because there is little necessity for the gradation correction process, the threshold value is set to be large. Also, if the main-object Bv value is a positive value, the main object can be excessively bright. Because this case is outside the target of the present gradation correction process, the threshold value is set to be large (TH_max).

In S1506, the recording mode determination unit 1406 compares the threshold value calculated by the threshold value calculation unit 1405 with the exposure level difference and determines the recording mode. If the exposure level difference is greater than or equal to the threshold value, the recording mode determination unit 1406 determines that the gradation correction is likely to be necessary later and the process proceeds to S1507 to perform the recording process in the high-quality mode. In the high-quality mode, a process of recording data of a frame image, a distance map, and a RAW image is performed. A RAW image before image processing is recorded because the gradation correction is performed before a non-linear process such as gamma conversion. On the other hand, if the exposure level difference is less than the threshold value, the recording mode determination unit 1406 determines that it is unnecessary to perform the gradation correction later and the process proceeds to S1508 to perform a recording process in the normal mode. The process of the recording mode control unit 104 is performed during photographing.

Next, a region-specific gradation correction process to be performed in response to an instruction of the user after recording will be described. The present process is mainly performed by the image processing unit 105, but the operation unit 107 which receives the instruction of the user and the system control unit 106 are also related thereto. Hereinafter, the region-specific gradation correction process to be performed after recording is referred to as a "post-correction process." The post-correction process will be described with reference to FIGS. 17 and 18.

Figure 17:
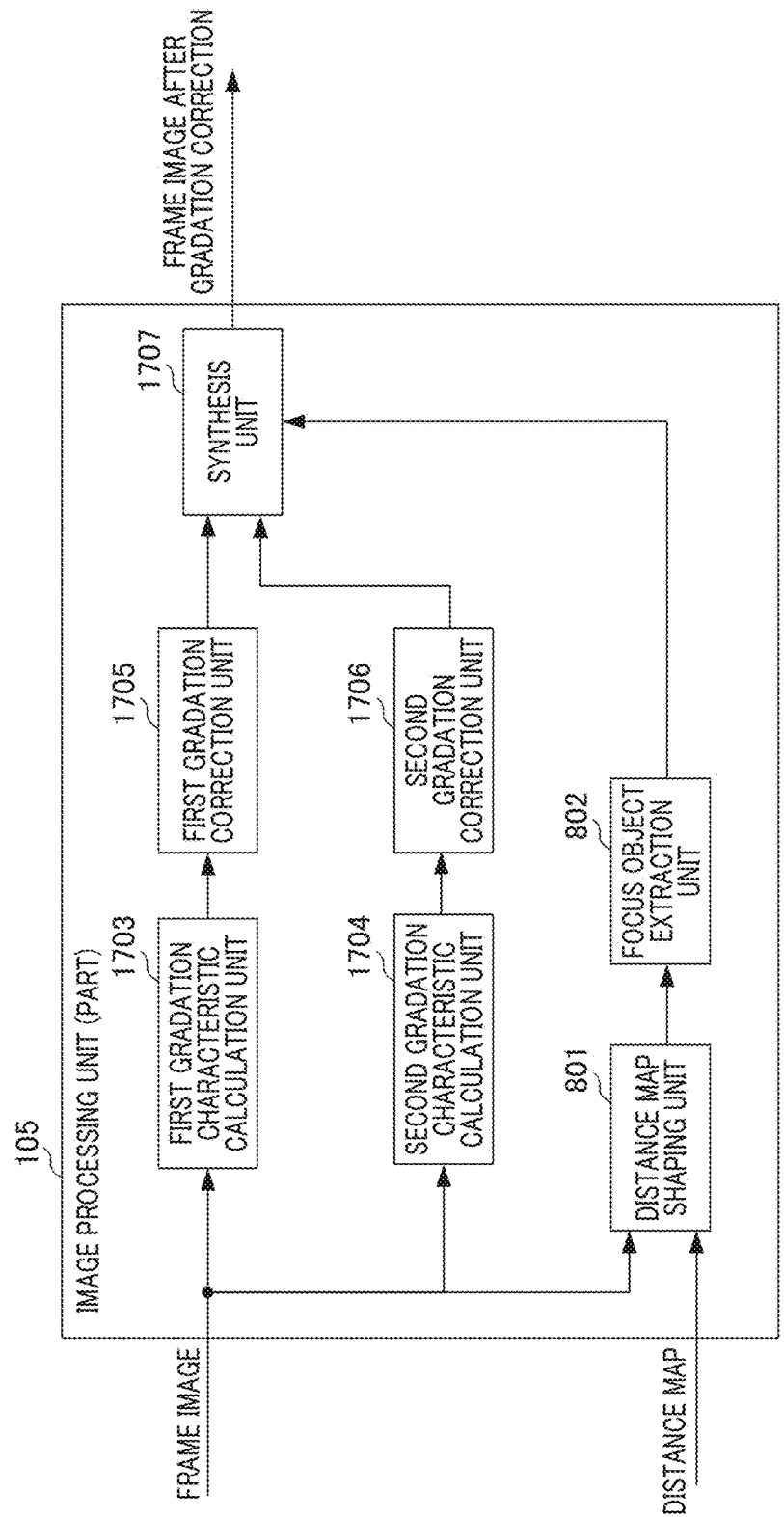
FIG. 17 is a block diagram of an image processing unit in the second embodiment.

FIG. 17 is a processing block diagram of the image processing unit 105 related to the post-correction process. A difference from the configuration illustrated in FIG. 8 is as follows.

A first gradation characteristic calculation unit 1703 acquires frame image data and calculates a first gradation characteristic. The first gradation characteristic is a gradation characteristic of a main-object region. Also, a second gradation characteristic calculation unit 1704 acquires frame image data and calculates a second gradation characteristic. The second gradation characteristic is a gradation characteristic of a background region. The first gradation correction unit 1705 performs the gradation correction process on an input frame image using the first gradation characteristic. A second gradation correction unit 1706 performs the gradation correction process on an input frame image using the second gradation characteristic. A synthesis unit 1707 acquires information of a focus object from a focus object extraction unit 802 and acquires a first image on which the first gradation correction unit 1705 performs the gradation correction process and a second image on which the second gradation correction unit 1706 performs the gradation correction process to perform a synthesis process. Details of processes of the units will be described below.

Figure 18:
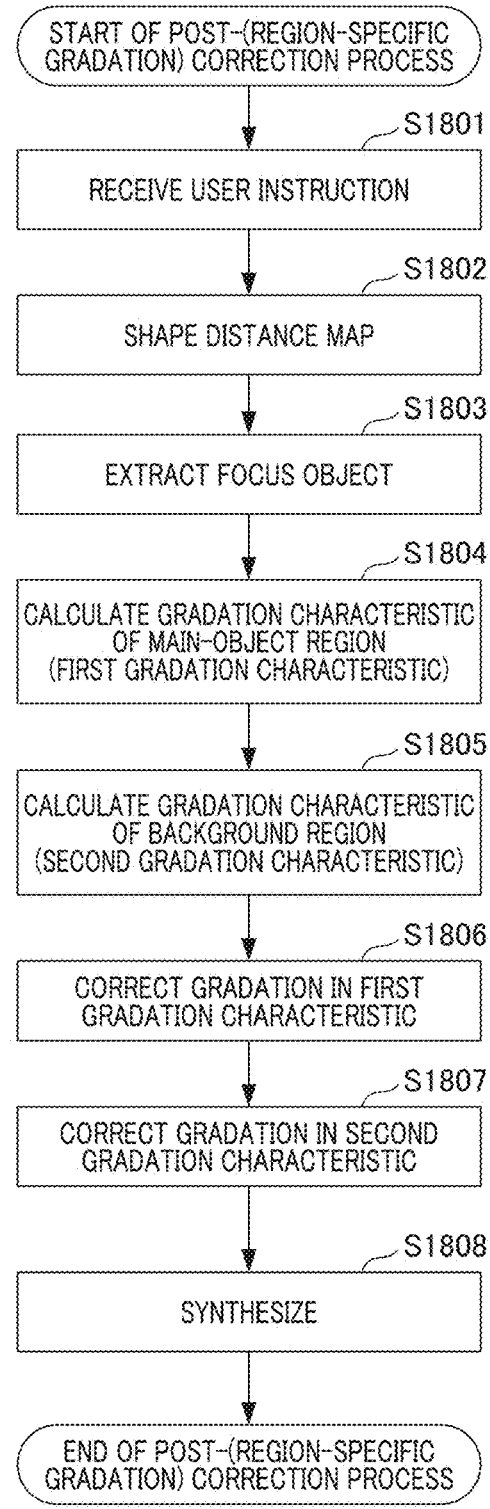
FIG. 18 is a flowchart of a region-specific gradation correction process in the second embodiment.

FIG. 18 is a flowchart illustrating a post-correction process.

Figure 19:
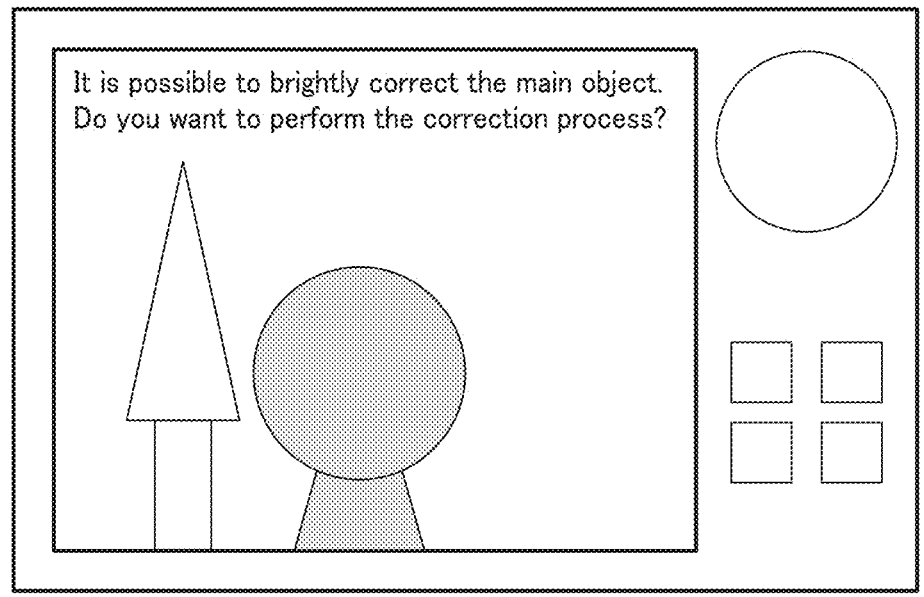
FIG. 19 is a diagram illustrating a screen example for notifying that the region-specific gradation correction process is possible.

First, in S1801, the imaging apparatus receives an instruction of the post-correction process from the user. FIG. 19 illustrates a display example and the display unit 108 presents that the post-correction process is possible on a frame of a high-quality record on which the post-correction process is possible to the user. Also, display and input processes for asking for the user about an instruction regarding whether or not to perform the post-correction process are performed. If the user has selected an operation of performing the gradation correction process during moving-image reproduction, the system control unit 106 receives the instruction from the operation unit 107 and commands the image processing unit 105 to perform a process subsequent to S1802.

Figure 20A:
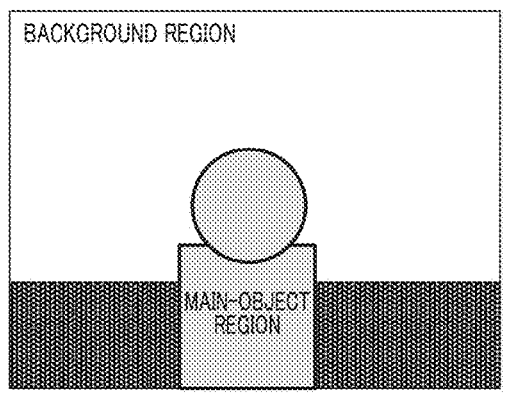
FIGS. 20A to 20F are diagrams illustrating a gradation characteristic calculation method in the second embodiment.

In S1802, the distance map shaping unit 801 performs a distance map shaping process. In S1803, the focus object extraction unit 802 extracts a focus object. In S1804, the first gradation characteristic calculation unit 1703 calculates the first gradation characteristic. In S1805, the second gradation characteristic calculation unit 1704 calculates the second gradation characteristic. A process of calculating the first gradation characteristic and the second gradation characteristic will be described with reference to FIGS. 20A to 20F. FIG. 20A illustrates an input frame image and illustrates a main-object region and a background region within the image. That is, the main-object region detection unit 201 separately detects the main-object region and the background region within the image in the input frame image. Separate gradation correction processes are performed on the main-object region and the background region. First, regular gain processing is performed on the main-object region. The regular gain processing is performed because the main object is likely to be uniformly darkened by backlight, shade, or the like if the present function is applied. On the other hand, luminance-specific gain processing is performed on the background region. The reason for this is that there are generally objects having various luminances in the background region and the D range is wide. Gradation compression is performed so that a gradation characteristic of each region is not lost. Also, the gain characteristic is not limited to the above concept and a characteristic of any shape is assumed to be taken.

Figure 20D:
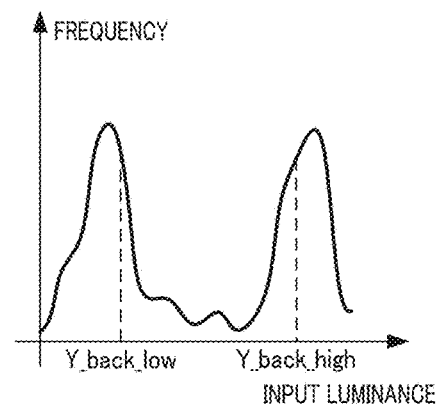
Figure 20B:
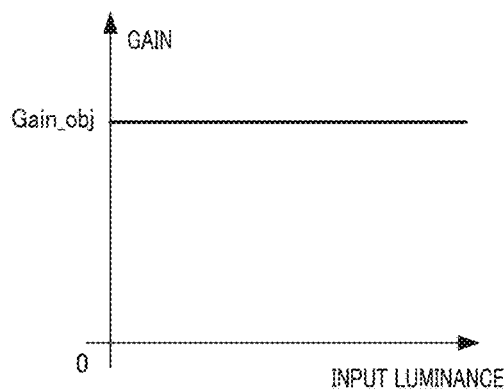

FIG. 20B illustrates a characteristic of a gain (the vertical axis) for input luminance (the horizontal axis) in the main object region. The gain is a fixed value (denoted by Gain_obj). Because an average luminance value Y_obj of the main-object region is corrected to be a target luminance value Y_obj_target in appropriate exposure, a gain Gain_obj is calculated according to the following Equation (8).

$$\text{Gain\_obj} = Y\_obj\_target / Y\_obj \quad (8)$$

Figure 20E:
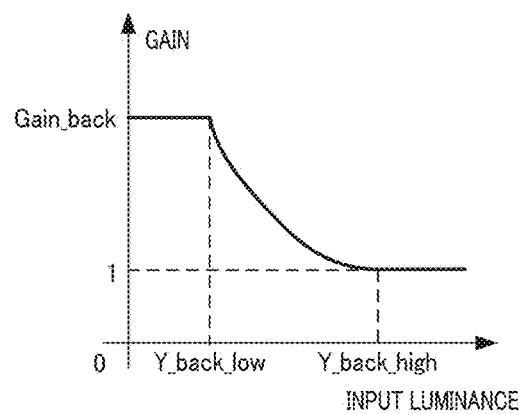
Figure 20C:
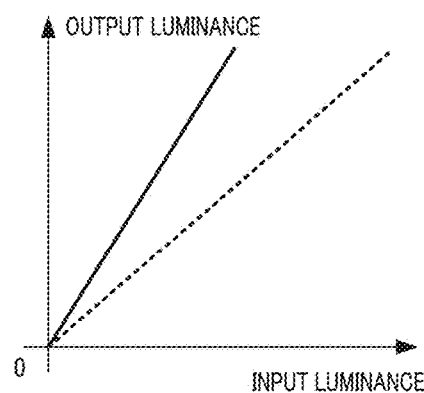

FIG. 20C illustrates a characteristic of input/output luminance when a process has been performed by a gain characteristic illustrated in FIG. 20B in a solid-line graph. That is, this characteristic is the first gradation characteristic. A dotted line indicates a case in which a ratio between the input luminance value and the output luminance value is 1:1. A slope of the graph line of the first gradation characteristic is greater than a slope of the graph line indicated by a dotted line.

FIG. 20D illustrates a representative luminance value in a luminance histogram of the background region. The horizontal axis represents input luminance and the vertical axis represents frequency. FIG. 20E illustrates a gain characteristic for input luminance in the background region. The gain changes according to the input luminance. The second gradation characteristic calculation unit 1704 calculates representative luminance values of a dark part side and a bright part side of the input luminance. In the calculation process, as illustrated in FIG. 20D, a luminance histogram of the background region is acquired. The representative luminance value Y_back_low is a representative luminance value of a dark part calculated when the number of pixels of a predetermined ratio has been counted from a minimum luminance. The representative luminance value Y_back_high is a representative luminance value of a bright part calculated when the number of pixels of a predetermined ratio has been counted from a maximum luminance. A maximum gain (denoted by Gain_back) for the background region is calculated according to the following Equation (9) so that an average luminance value Y_back of the background region is a target luminance value Y_back_target in appropriate exposure.

$$\text{Gain\_back} = Y\_back\_target / Y\_back \quad (9)$$

Figure 20F:
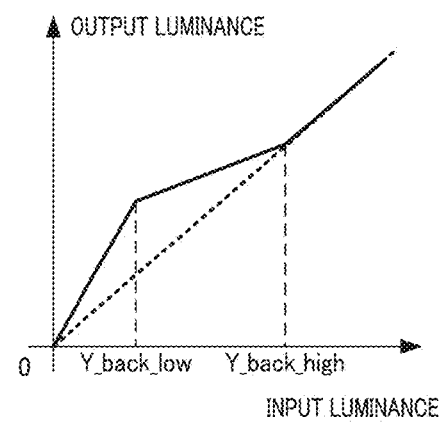

In the gain characteristic illustrated in FIG. 20E, Gain_back is a fixed value in a section in which the input luminance value is less than or equal to Y_back_low and a minimum gain amount becomes 1 in a section in which the input luminance value is greater than or equal to Y_back_high. In a section between T_back_low and Y_back_high, there is a monotonic decrease characteristic according to the input luminance value. FIG. 20F illustrates a characteristic of input/output luminance when a process has been performed in a gain characteristic illustrated in FIG. 20D in a solid-line graph. This characteristic is the second gradation characteristic. The solid-line graph indicating the second gradation characteristic has a bent linear shape projecting to an upper side in Y_back_low and has a shape matching a dotted-line graph line (when a ratio between the input luminance value and the output luminance value is 1:1) in a section of Y_back_high or more.

In S1806 of FIG. 18, the first gradation correction unit 1705 performs a gradation correction process on the input frame image using the first gradation characteristic. In S1807, the second gradation correction unit 1706 performs a gradation correction process on the input frame image using the second gradation characteristic. These processes are processes of converting the luminance value of the input frame image in the gradation conversion characteristics illustrated in FIGS. 20C and 20F. In the next S1808, the synthesis unit 1707 synthesizes two images on which the gradation correction processes have been performed. The process of the synthesis unit 1707 will be described with reference to FIGS. 21A to 21C.

Figure 21A:
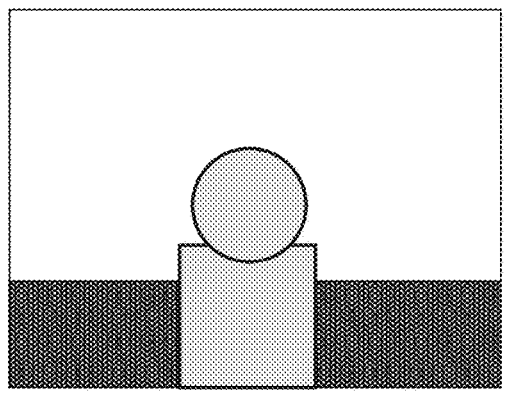
FIGS. 21A to 21C are diagrams illustrating a synthesis process.
Figure 21B:
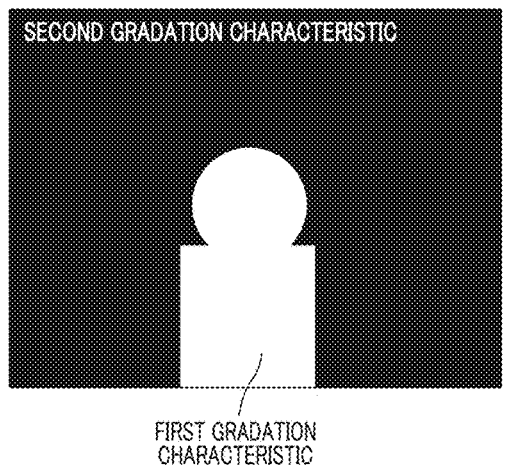
Figure 21C:
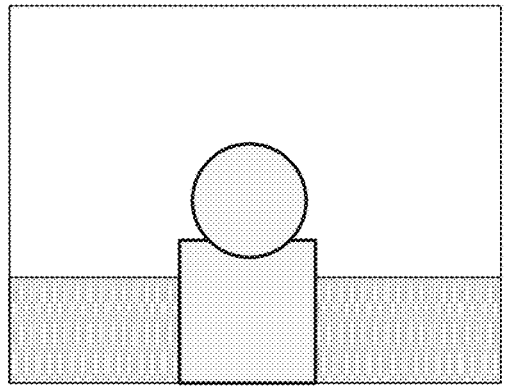

FIG. 21A illustrates an input frame image and FIG. 21B illustrates a focus plane image extracted by the focus object extraction unit 802. In the synthesis process, an image on which the gradation correction has been performed in the first gradation characteristic is output with respect to the focus plane region within the image shown in a white region in FIG. 21B. Also, an image on which the gradation correction has been performed in the second gradation characteristic is output with respect to the non-focus plane region (the background region) within the image shown in a black region in FIG. 21B. If this process is performed, an image after the synthesis process with respect to the input frame image of FIG. 21A becomes an image illustrated in FIG. 21C. FIG. 21C illustrates an image on which the gradation correction process has been performed in different gradation conversion characteristics with respect to the main-object region which is a focus plane and the background region which is a non-focus plane region. Finally, data of an image on which region-specific gradation correction has been performed is recorded on a recording medium by the recording unit 109.

In the present embodiment, whether or not to simultaneously acquire additional information for region extraction is dynamically switched according to an exposure level difference (a brightness difference) between the main-object region and the background region. Thus, it is possible to reduce a burden on the user due to a large record amount and acquire information for the post-correction process (gradation correction). In the present embodiment, an image and depth distribution information are recorded in the high-quality mode when the exposure level difference between the main object and the background region is greater than the threshold value. However, the present invention is not limited thereto. For example, recording may be performed in the high-quality mode when the object is imaged at more appropriate brightness when the exposure level difference between the main object and the background region is less than the threshold value than when it is greater than the threshold value. At this time, when the exposure level difference is greater than the threshold value, the image is recorded without recording the depth distribution information in the normal mode.

Third Embodiment

Next, the third embodiment of the present invention will be described. In the present embodiment, a post-blurring process described in the first embodiment is assumed and an objective is to further reduce a recorded amount, more particularly, during recording of information. In the first embodiment, information for post-processing is acquired, for example, with respect to a frame for which it is determined that the image of the background is not sufficiently blurred on the basis of a distance difference between a main object and a background. However, a distance between the main object and the background may be short according to a photographing scene normally. In this case, information for the post-processing is acquired across substantially all frames. As a result, a recorded amount of captured images is likely to significantly increase. Therefore, in the present embodiment, a process of further narrowing down a frame to be recorded in the high-quality mode to appropriately maintain the recorded amount will be described. That is, in the present embodiment, the determination of whether or not it is necessary to reduce the recorded amount to be described below and the determination of a recording mode based on a score determination of the object may be partially or totally combined in each of the first and second embodiment and executed.

Figure 22:
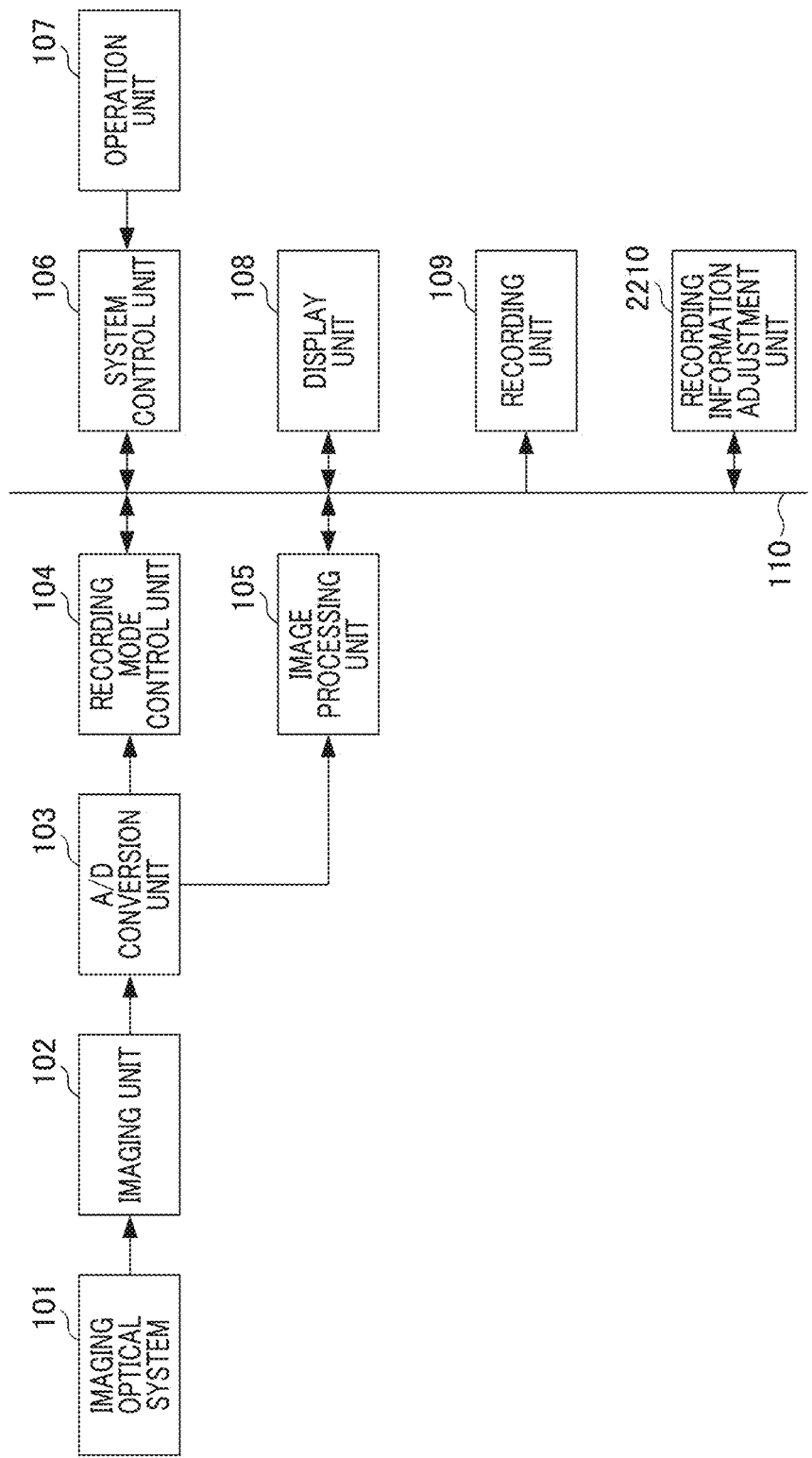
FIG. 22 is a block diagram illustrating a configuration of an imaging apparatus according to a third embodiment of the present invention.
Figure 23:
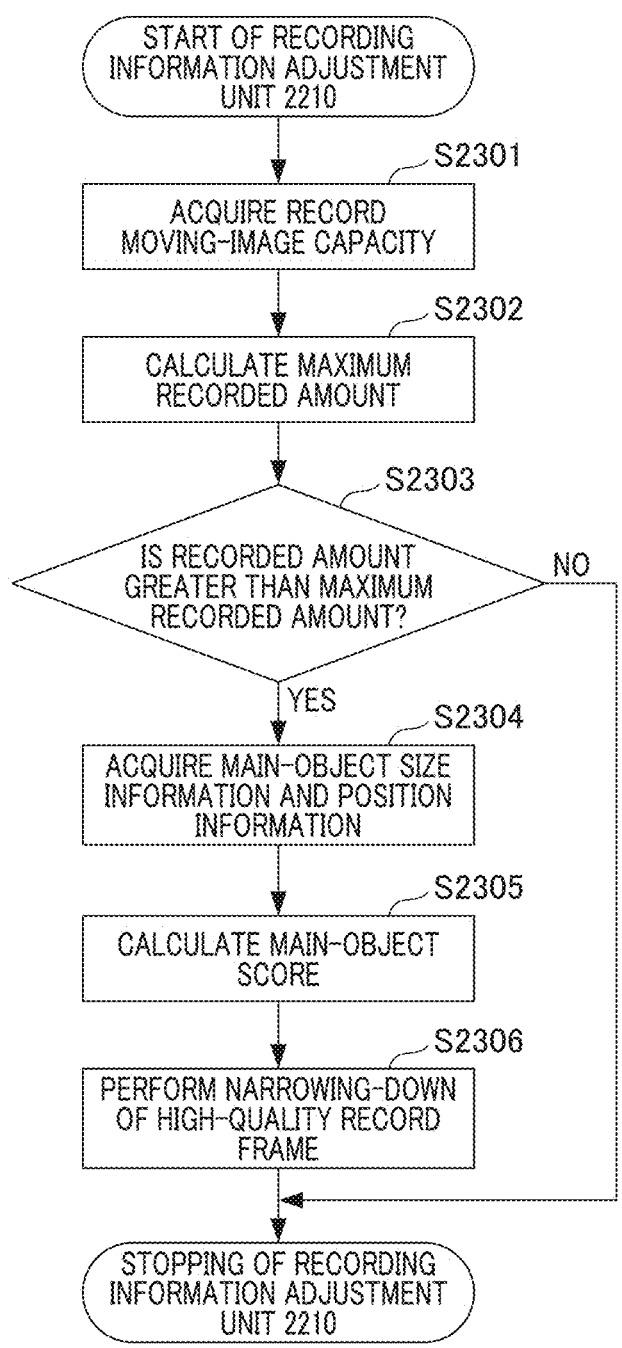
FIG. 23 is a flowchart illustrating a process of a recording information adjustment unit in the third embodiment.

FIG. 22 is a block diagram illustrating a configuration capable of being applied to the imaging apparatus of the present embodiment. A difference from the configuration illustrated in FIG. 1 is that a recording information adjustment unit 2210 is added. FIG. 23 is a flowchart illustrating a process of the recording information adjustment unit 2210. The recording information adjustment unit 2210 will be described with reference to FIG. 23. The following process is executed after the recording unit 109 records a series of pieces of moving-image data in a recording mode to be controlled by the recording mode control unit 104.

The recording information adjustment unit 2210 acquires an image recorded amount (denoted by MEM) in S2301 and calculates a maximum recorded amount (denoted by MEM_MAX) in S2302. The maximum recorded amount MEM_MAX is calculated according to the following Equation (10).

$$MEM\_MAX = MEM\_FRAME \times NUM\_FRAME \times k1 \times k2 \qquad (10)$$

In Equation (10), MEM_FRAME is a recorded amount per frame. In this case, it is assumed that inter-frame compression or intra-frame compression is not performed. NUM_FRAME is the total number of frames of moving images to be processed. k1 denotes a predetermined compression rate and has a value of 1 or less. An actual compression rate changes depending upon a photographing scene, but is assumed to be a predetermined compression rate here. k2 is an allowed value of a capacity increase rate based on recording of additional information and has a value of 1 or more.

In the next S2303, the recording information adjustment unit 2210 compares the recorded amount MEM with the maximum recorded amount MEM_MAX. If MEM is less than or equal to MEM_MAX, the process ends without performing adjustment of the record information. Also, if MEM is greater than MEM_MAX, the recording information adjustment unit 2210 determines that it is necessary to adjust the record information and the process proceeds to S2304.

If it is determined that it is necessary to reduce the recorded amount in the present embodiment, a process of further narrowing down a frame to be recorded in the high-quality mode is performed on the basis of size information and position information of a main object. The reason for this is that a frame considered to be recorded as a still image by the user blurring the background after photographing is a frame in which the main object is shown in a good state. Specifically, the frame acquired by the narrowing-down process is a frame in which the image region of the main object is located to be close to the center of a captured image and a size of the main object is shown to be large.

Figure 24B:
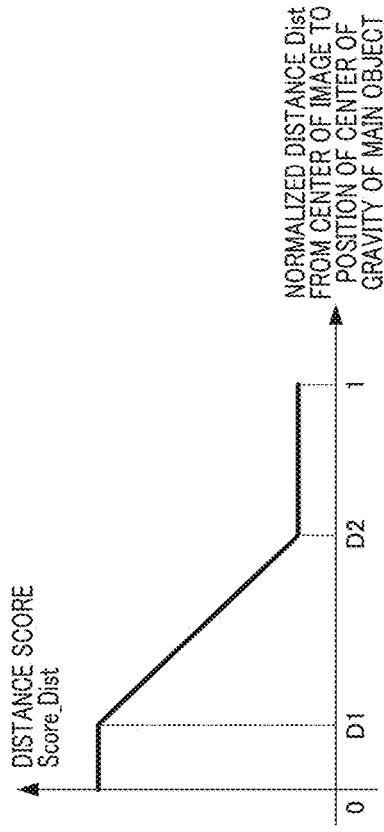
FIGS. 24A to 24C are diagrams illustrating a main-object score calculation process.
Figure 24C:
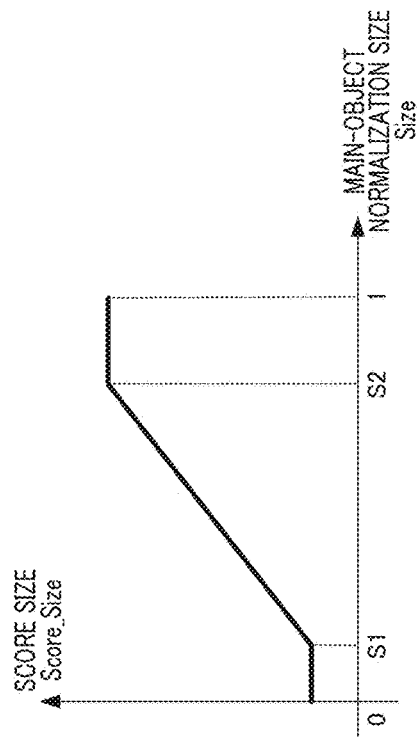
Figure 24A:
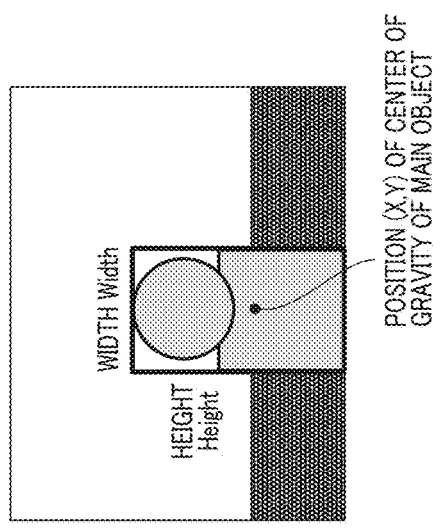

The recording information adjustment unit 2210 acquires the size information and the position information of the main object in S2304 of FIG. 23 and calculates a main-object score on the basis of the size information and the position information of the main object in the next S2305. Also, a process subsequent to S2304 is assumed to be performed on all recorded frames. Processes of S2304 and S2305 will be described with reference to FIGS. 24A to 24C. FIG. 24A illustrates an input frame image. Coordinates of a center-of-gravity position of the main-object region are denoted by (X,Y), the height of the main-object region is denoted by Height, and the width of the main-object region is denoted by Width.

In S2304, a process of extracting the main-object region in a rectangular shape from the input frame image illustrated in FIG. 24 and acquiring the width Width and the height Height is executed. Further, the extracted center-of-gravity position coordinates (X,Y) of the main-object region are acquired. A normalized size (denoted by Size) corresponding to an area from the acquired information is calculated according to the following Equation (11).

$$Size = Width \times Height / Size\_all \qquad (11)$$

In Equation (11), Size_all denotes a normalized coefficient for normalization independent of the image size. For example, Size_all is assumed to be an area of the entire image. In this case, Size denotes a ratio of an area of the main-object region to the area of the entire image. Also, if coordinates of an image center position are denoted by ($X_c$, $Y_c$), a normalized distance (denoted by Dist) from ($X_c$, $Y_c$) to the center-of-gravity position coordinates (X,Y) of the main object region is calculated according to the following Equation (12)

$$Dist = \sqrt{(X-X_c)^2 + (Y-Y_c)^2}/R \qquad (12)$$

In Equation (12), R denotes a normalized coefficient corresponding to a distance from the image center position to an image end part. That is, the normalized distance Dist denotes a ratio of a distance difference between coordinates ($X_c$, $Y_c$) and (X,Y) to a distance from the image center position to the image end part.

Next, in S2305, a main-object score is calculated. Description will be given with reference to FIGS. 24B and 24C. FIG. 24B illustrates a distance score calculation characteristic. The horizontal axis represents a normalized distance Dist and the vertical axis represents a distance score (denoted by Score_Dist). FIG. 24C illustrates a size score calculation characteristic. The horizontal axis represents a normalized size Size and the vertical axis represents a size score (denoted by Score_Size).

In the present embodiment, first, the distance score Score_Dist and the size score Score_Size are calculated according to the characteristics illustrated in FIGS. 24B and 24C from calculated normalized distance information and normalized size information. In relation to the characteristic of the distance score Score_Dist illustrated in FIG. 24B, a monotonic decrease characteristic for Dist is given because the score is larger when the image of the object is closer to the image center part. FIG. 24B illustrates characteristics in which linear interpolation is performed in a first-order equation between two points. In a range in which a Dist value is less than a first threshold value D1 for the normalized distance Dist, the distance score Score_Dist is fixed. Also, in a range in which the Dist value is greater than a second threshold value D2 for the normalized distance Dist, the distance score Score_Dist is fixed. If the Dist value is greater than or equal to the first threshold value and is less than or equal to the second threshold value, a value of the distance score Score_Dist linearly decreases with respect to an increase of the Dist value.

In relation to the characteristic of the size score Score_Size illustrated in FIG. 24C, a monotonic increase characteristic for Size is given because the score is larger when the image size of the object is larger. FIG. 24C illustrates characteristics in which linear interpolation is performed in a first-order equation between two points. In a range in which a Size value is less than a first threshold value S1 for the normalized size Size, the size score Score_Size is fixed. Also, in a range in which the Size value is greater than a second threshold value S2 for the normalized size Size, the size score Score_Size is fixed. If the Size value is greater than or equal to the first threshold value and is less than or equal to the second threshold value, a value of the size score Score_Size linearly increases with respect to an increase of the Size value.

Characteristics illustrated in FIGS. 24B and 24C are examples and an interpolation process may be performed by setting three or more points.

Next, a main-object score (denoted by Score) is calculated according to the following Equation (13) from the calculated distance score Score_Dist and size score Score_Size.

$$\text{Score}=w\_d\times\text{Score\_Dist}+w\_s\times\text{Score\_Size} \quad (13)$$

In Equation (13), w_d and w_s are any weighted coefficients.

Figure 25:
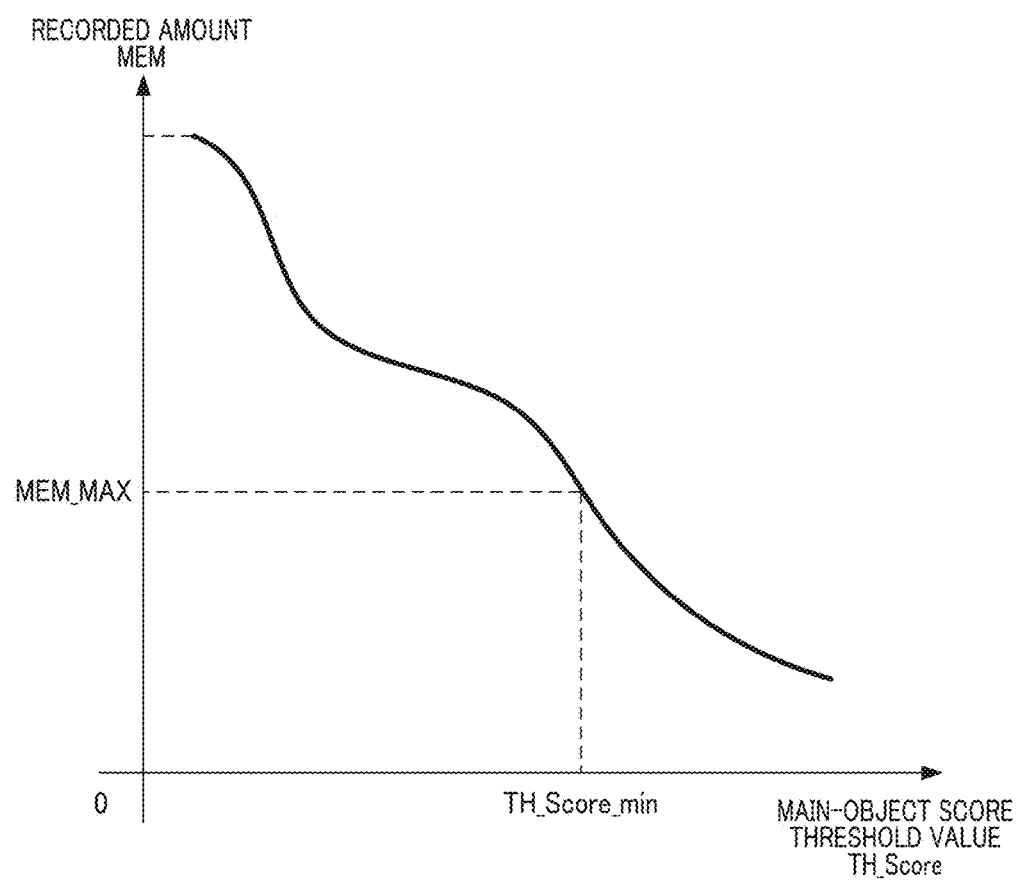
FIG. 25 is a diagram illustrating a process of calculating a main object score threshold value.

In S2306 of FIG. 23, the recording information adjustment unit 2210 performs a narrowing-down process on a high-quality record frame. The main-object score Score is calculated across all frames in S2305. The recording information adjustment unit 2210 compares the main-object score Score with a predetermined threshold value (denoted by TH_Score). A recording process in the high-quality mode is performed on a frame for which a value of the main-object score Score exceeds the threshold value TH_Score. The normal mode operates for a frame for which the value of the main-object score Score is less than or equal to the threshold value and no additional information is deleted and recorded. Specific description will be given with reference to FIG. 25. The horizontal axis represents a threshold value TH_Score and the vertical axis represents a recorded amount MEM. Because the number of frame images (the number of frames) of high quality decreases as the threshold value TH_Score increases, the recorded amount MEM decreases. A maximum threshold value for which the recorded amount MEM is less than the upper limit value MEM_MAX calculated in S2302 is denoted by TH_Score min. It is possible to acquire a moving image while minimizing the moving-image recorded amount to MEM_MAX or less by narrowing down the high-quality frame using the threshold value TH_Score min.

In the present embodiment, it is possible to suppress an increase of the recorded amount of the moving image according to the process of the recording information adjustment unit 2210. Also, in the present embodiment, the position information and the size information of the main-object region are used as indices for narrowing down the high-quality frame.

Also, a scene change degree may be used as another index for switching the recording mode as another embodiment. The scene change degree is an index indicating a magnitude of the change when an image has changed between different frames (for example, a current frame and a previous frame). The scene change degree is calculated, for example, by aligning the current frame and the previous frame and calculating a difference between them. If an image change between two frames which are temporally continuous is not substantially present, a process of thinning additional information of the high-quality mode is executed. If there is a large image change between two frames which are temporally continuous, a process of recording the additional information according to the two frames is executed.

The determination based on the above-described object score or the determination based on the scene change degree is performed if it is determined that it is necessary to reduce the recorded amount in the present embodiment, but the recording mode may be switched using the object score or the scene change degree as a method of determining high-quality frames without performing the detection or the determination of the recorded amount.

Fourth Embodiment

Next, the fourth embodiment of the present invention will be described. In the present embodiment, the post-blurring process described in the first embodiment is assumed and an objective is to further reduce a motion blur of each frame. Control for changing a shutter speed and a frame rate in the case of recording in the high-quality mode according to motion of the main object will be described.

A state in which a motion blur of the object is eliminated from a target frame for generating a high-quality still image according to the post-processing and the object is stopped is preferable. In exposure control when a moving image is captured, the shutter speed is controlled so that the motion of the object image is not seen in a discontinuous state when the frame image is continuously viewed. That is, control is performed so that the shutter speed is not too fast. On the other hand, if one of images of moving frames captured as described above is viewed as a still image, motion blur is likely to occur due to a movement speed of the object. Therefore, an objective of the present embodiment is to suppress the motion blur of the object in relation to exposure control of the frame image acquired in the high-quality mode, particularly, the shutter speed.

Figure 26:
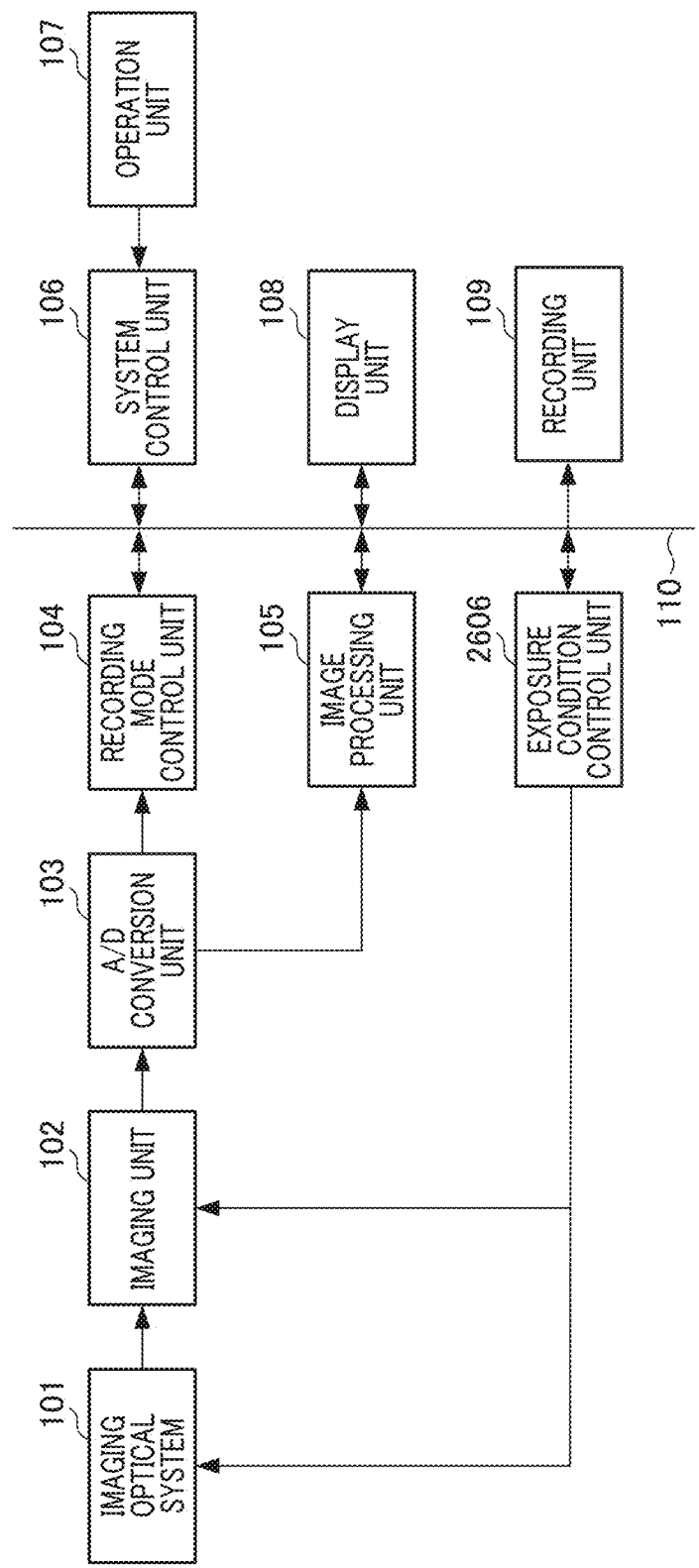
FIG. 26 is a block diagram illustrating a configuration of an imaging apparatus according to a fourth embodiment of the present invention.
Figure 27:
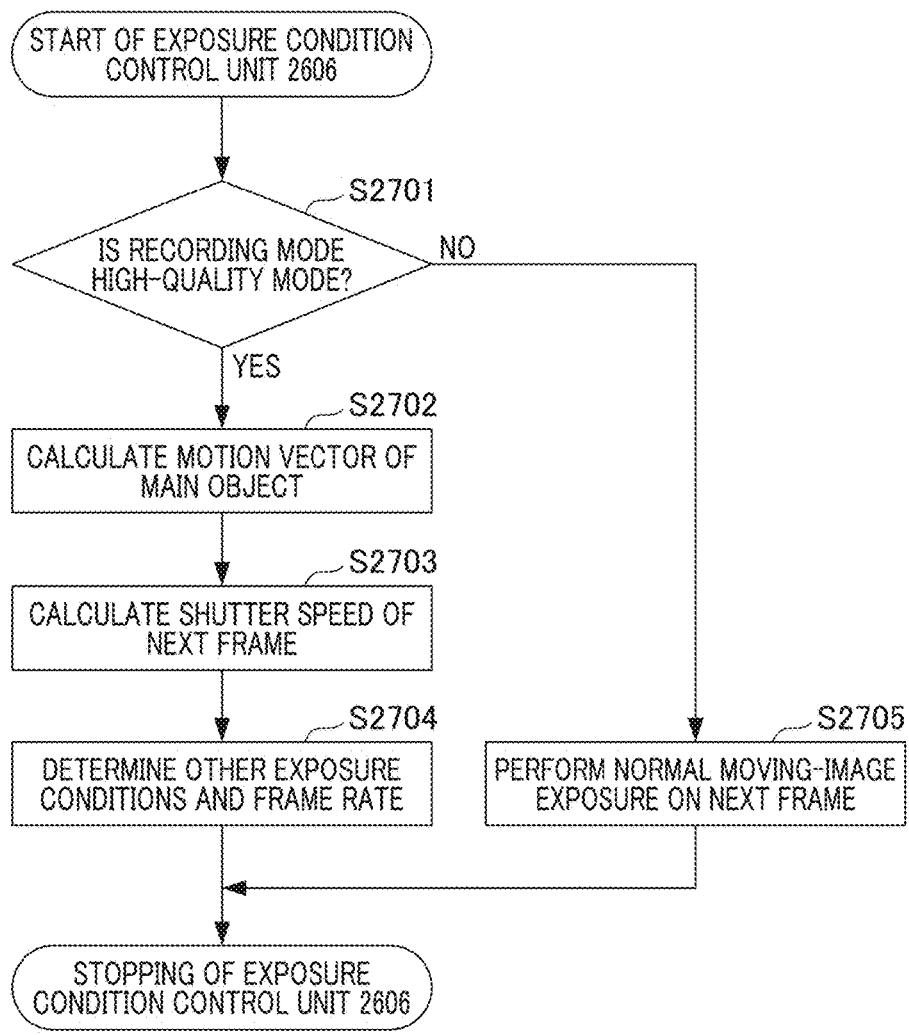
FIG. 27 is a flowchart illustrating a process of an exposure condition control unit in the fourth embodiment.

FIG. 26 is a block diagram illustrating a configuration capable of being applied to the imaging apparatus of the present embodiment. A difference from the configuration illustrated in FIG. 1 is that an exposure condition control unit 2606 is provided. FIG. 27 is a flowchart illustrating a process of the exposure condition control unit 2606. The exposure condition control unit 2606 will be described with reference to FIG. 27. The following process is performed after the process of the recording mode control unit 104 and is performed for every frame or at a predetermined frame interval.

First, in S2701, a process of determining whether or not the recording mode is the high-quality mode is performed. If the recording mode is the normal mode, the process proceeds to S2705 to perform a photographing operation in exposure of a moving image in the normal mode with respect to the next frame which is a time of one frame later than a current frame. On the other hand, if the recording mode is the high-quality mode, the process proceeds to S2702 to perform exposure control according to motion of the main object. In S2702, the exposure condition control unit 2606 calculates a motion vector of the main object. A method of calculating the motion vector is performed according to a well-known pattern matching process.

In the next S2703, the exposure condition control unit 2606 calculates a shutter speed of the next frame. The shutter speed of the next frame is denoted by Tv and the magnitude of the motion vector calculated in S2702 is denoted by v (unit: pixels). A frame interval is denoted by T_frame (1/60 sec if a frame rate is 60 fps). The shutter speed Tv is calculated according to the following Equation (14) from v and T_frame.

$$Tv = T\_frame/v \qquad (14)$$

Equation (14) means that Tv is calculated as a shutter speed for which the movement amount of the main object image is one pixel within an imaging time. In other words, Tv is the shutter speed for which the motion blur is included in one pixel. For example, T_frame may be 1/60 sec and v may be assumed to be six pixels. In this case, the shutter speed corresponding to movement of one pixel of the main object image is $Tv=1/360$ sec. Accordingly, a value less than Tv calculated by Equation (14) may be used as the shutter speed according to the objective of the present embodiment.

In S2704, the exposure condition control unit 2606 determines other exposure conditions and a frame rate. The other exposure conditions are specifically sensitivity and an aperture value. If the aperture value changes, an object field depth changes and a continuity with previous and subsequent frames is lost. Thus, in the present embodiment, the exposure is controlled such that it is regularly maintained by changing the sensitivity according to an amount of change of the shutter speed Tv. Also, when the shutter speed Tv increases, the frame rate is controlled such that it changes. For example, if the value of Tv is 1/120 sec or less, a process of changing the frame rate from 60 fps to 120 fps is executed. According to this process, an effect that it is difficult to miss a decisive moment for an object with fast motion is obtained. Finally, the exposure condition control unit 2606 controls the process of capturing the next frame such that it is performed by reflecting the feedback of the exposure conditions determined in S2704 or S2705 in control of the imaging optical system 101 and the imaging unit 102.

In the present embodiment, photographing is possible at an optimum shutter speed according to the speed of an object (a moving object) according to the process of the exposure condition control unit 2606. Also, in order to prevent the motion of the moving object from being discontinuously seen because the value of the shutter speed Tv according to the image frame is large when a moving image is viewed, a process of electronically blurring the object image or the like is performed according to a motion amount of the object.

Also, the determination of the recording mode is basically performed for every frame and the mode is switched to perform control in the above-described first, second, third, and fourth embodiment, but the recording mode may be periodically switched to perform control when recording is manually or automatically performed in the high-quality mode for every frame with the purpose of reducing a record data amount.

If the setting is manually performed, for example, if the predetermined number of frames according to a user operation via the operation unit 107 is set to 5, depth distribution information is recorded along with an image as the high-quality mode for one of five frames. Alternatively, a cycle of recording in the high-quality mode may be determined according to an imaging frame rate set by the user.

If the setting is automatically performed, at least one of determinations of a distance difference between the main object and the background, an exposure level difference, an object score, a scene matching degree, etc. in the above-described embodiment may be periodically performed and it is only necessary to control recording such that it is performed in the high-quality mode in a recording cycle until the next determination by determining recording cycles in the high-quality mode.

(Pattern of Recording Type in Each Embodiment)

In the above-described embodiments, a type in which a plurality of captured images (frames) and depth distribution information corresponding to some frames are recorded may be assumed to be the following one.

FIGS. 28A to 28D are diagrams obtained by imaging patterns with respect to a type in which a plurality of captured images (frames) and depth distribution information corresponding to some frames are recorded. That is, as a recording type, as in FIG. 28A, a plurality of images 1, 2, and 3 which are sequentially captured and acquired and distance maps 1 and 3 corresponding to images 1 and 3 are all recorded as separate files. In this case, it is only necessary to record information for associating a header of each image file with the distance map (or information indicating that there is no corresponding distance map) and record information of an image corresponding to the distance map side.

Figure 28A:
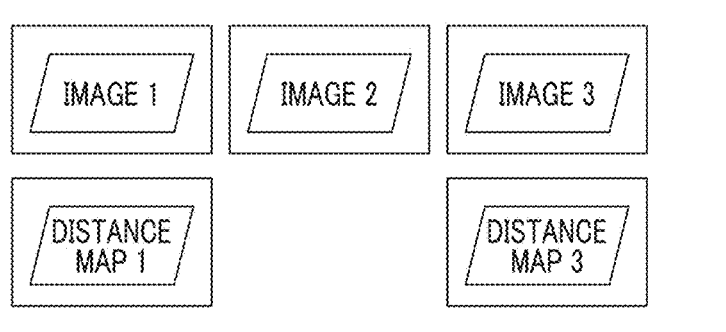
FIGS. 28A to 28D are diagrams illustrating recording types of an image and a distance map in the first to fourth embodiments.
Figure 28B:
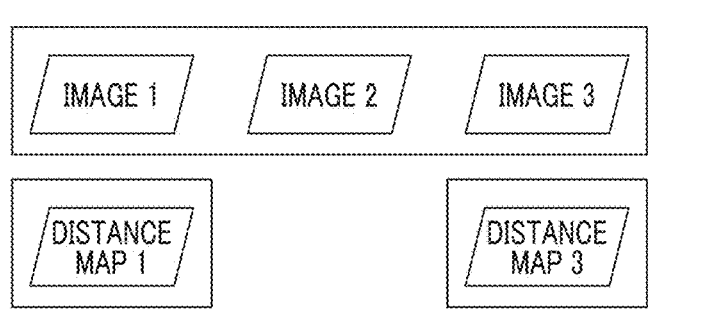

Also, as in FIG. 28B, images may be associated (encoded) as continuous images and may be one moving-image file and a plurality of distance maps may be individually recorded as distance map files in a type synchronized with the moving-image file. A time code of a corresponding moving image is recorded in the distance map and it is possible to read and use the time code in association with the image when necessary during moving-image editing including still-image clipping.

Figure 28C:
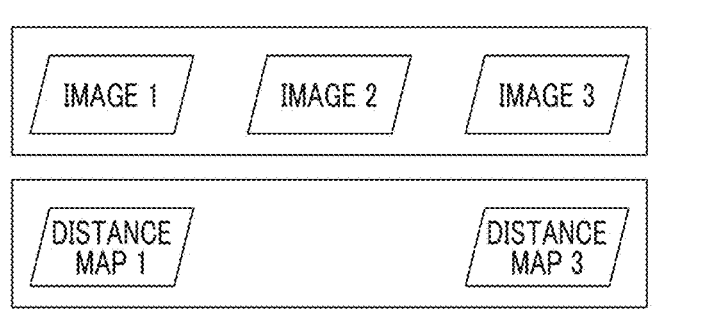

Also, as in FIG. 28C, images may be associated (encoded) as continuous images and may be one moving-image file and a plurality of distance maps may be recorded as another one of the file in a type synchronized with the moving-image file. In this case, the time code synchronized with the time code of each frame of the moving image is recorded in a corresponding distance map and it is only necessary to record the time code as one file. Unlike the type of FIG. 28B, it is easy to handle because the distance map is paired with a moving-image file by configuring the distance map in one file and it can be expected that there would be reduction in a data amount due to encoding between distance maps using well-known encoding technology when necessary.

Figure 28D:
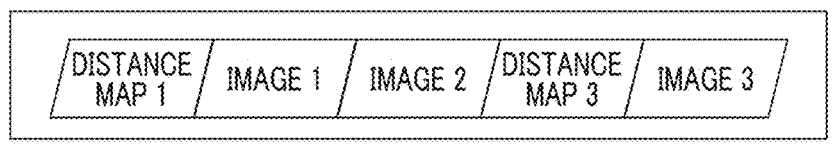

Also, as in FIG. 28D, an image and a corresponding distance map in front of or behind the image may be connected and recorded in a type in which they are recorded to totally form one moving-image file. In this type, the distance map which is depth distribution information corresponding to an image on which a recording process is performed is recorded in front of or behind the image data as a parameter of the image data. In this type, there is an advantage in that it is possible to handle the distance map and the image data as one file and to easily access the distance map because the corresponding distance map is also adjacent to the image.

As above, according to the present invention, it is possible to perform image recording having high convenience while minimizing a recorded amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), microprocessing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-004181, filed Jan. 13, 2016, Japanese Patent Application No. 2016-226621, filed Nov. 22, 2016, which are hereby incorporated by reference wherein in its entirety.

What is claimed is:

1. An image processing apparatus including
at least one non-transitory memory device;
at least one processor; and
a recording unit configured to acquire a plurality of image data and record the plurality of image data in a recording medium, the image processing apparatus comprising:
an acquisition unit configured to acquire depth distribution information of an object corresponding to image data; and
a control unit configured to perform a process of recording the plurality of image data by performing switching between a first mode in which the recording unit records the image data and the depth distribution information corresponding to the image data in the recording medium and a second mode in which the recording unit records the image data in the recording medium without recording the depth distribution information,
wherein the depth distribution information is one of an image shift map based on parallax amounts of a plurality of viewpoint images, a defocus map based on a defocus amount for every region, a distance map indicating a relative distance relationship of objects in image data, and distance information indicating a distance relationship between an imaging apparatus and each object acquired according to a time of flight (TOF) method; and
wherein the recording unit, the acquisition unit and the control unit are implemented by the at least one processor executing at least one program recorded on the at least one non-transitory memory device.

2. The image processing apparatus according to claim 1, wherein the control unit performs a recording process by performing switching between the first mode and the second mode during recording of the plurality of image data and causes the recording unit to record the plurality of image data as a moving image in the recording medium.

3. The image processing apparatus according to claim 2, wherein the recording unit records the plurality of image data and depth distribution information corresponding to image data on which a recording process is performed in the first mode in one moving-image file.

4. The image processing apparatus according to claim 3, wherein the recording unit records depth distribution information corresponding to image data on which a recording process is performed in the first mode as metadata of the image data in front of or behind the image data in the moving-image file.

5. The image processing apparatus according to claim 1, wherein the control unit acquires the depth distribution information including depth information of a main object of a plurality of objects and a background and performs a recording process in the first mode if a difference between the depth information of the main object and the depth information of the background included in the depth distribution information is less than or equal to a threshold value.

6. The image processing apparatus according to claim 5, further comprising: a threshold value calculation unit configured to calculate the threshold value from a focus distance of an imaging optical system, the depth information of the main object included in the depth distribution information, and an allowed defocus amount;
wherein the threshold value calculation unit is implemented by the at least one processor executing at least one program recorded on the at least one non-transitory memory device.

7. The image processing apparatus according to claim 5, wherein the control unit determines whether or not to perform a recording process in the first mode according to a result of comparing the difference with the threshold value and an F value of an imaging optical system.

8. The image processing apparatus according to claim 1, wherein the control unit calculates an evaluation value indicating a dynamic range of a frame and determines whether or not to perform a recording process in the first mode by comparing the evaluation value with a threshold value.

9. The image processing apparatus according to claim 8, wherein the control unit calculates an exposure level difference between a main-object region related to a main object among a plurality of objects and a background region as the evaluation value, performs a recording process in the first mode if the exposure level difference is greater than or equal to the threshold value, and performs a recording process in the second mode if the exposure level difference is less than the threshold value.

10. The image processing apparatus according to claim 1, further comprising: an extraction unit configured to extract information of a main-object region related to a main object among a plurality of objects from image data and depth distribution information recorded in the first mode; and
an image processing unit configured to acquire the information of the main-object region extracted by the extraction unit and perform image processing on the image data;
wherein the extraction unit is implemented by the at least one processor executing at least one program recorded on the at least one non-transitory memory device.

11. The image processing apparatus according to claim 10, wherein the image processing unit determines a background region within an image from information of the main-object region and performs a process of blurring a background image.

12. The image processing apparatus according to claim 1, further comprising:
an extraction unit configured to extract information of a main-object region related to a main object among a plurality of objects from image data and depth distribution information recorded in the first mode; and
an image processing unit configured to acquire the information of the main-object region extracted by the extraction unit and perform image processing on the image data,
wherein the image processing unit determines the main-object region and a background region within an image from the information of the main-object region and performs different gradation correction processes in the main-object region and the background region;
wherein the extraction unit is implemented by the at least one processor executing at least one program recorded on the at least one non-transitory memory device.

13. The image processing apparatus according to claim 1, further comprising:
an adjustment unit configured to acquire a recorded amount of a moving image and adjust a record amount by narrowing down a frame to be recorded in the first mode if the recorded amount is greater than or equal to a threshold value,
wherein the adjustment unit performs control for recording image data of the narrowed-down frame and the depth distribution information;
the adjustment unit is implemented by the at least one processor executing at least one program recorded on the at least one non-transitory memory device.

14. The image processing apparatus according to claim 1, wherein the control unit compares a score calculated from at least one of position information and size information of a main object among a plurality of objects with a threshold value, performs a recording process in the first mode in a frame for which the score is greater than the threshold value, and performs a recording process in the second mode in a frame for which the score is less than or equal to the threshold value.

15. The image processing apparatus according to claim 1, wherein the image processing unit detects a change in a scene from a difference between images and performs a recording process in the first mode if the change in the scene has been detected.

16. The image processing apparatus according to claim 1, wherein the control unit performs a recording process in the first mode for every predetermined frame in a plurality of images in time series acquired by the acquisition unit.

17. The image processing apparatus according to claim 1, wherein the control unit provides a notification of an image recorded in the first mode when a moving image recorded in the first mode is reproduced.

18. The image processing apparatus according to claim 1, wherein the acquisition unit calculates and acquires the image shift map which is the depth distribution information corresponding to the image data on the basis of a parallax amount of a parallax image which forms a pair corresponding to the acquired image data.

19. The image processing apparatus according to claim 1, wherein the acquisition unit calculates and acquires the defocus map which is the depth distribution information corresponding to the image data on the basis of a defocus amount for each region of the acquired image data.

20. The image processing apparatus according to claim 1, wherein the acquisition unit calculates and acquires the relative distance relationship of objects which is the depth distribution information corresponding to the image data on the basis of a defocus amount for each region of the acquired image data and an imaging optical system or an imaging element.

21. The image processing apparatus according to claim 1, wherein the acquisition unit acquires an object distance, which is the depth distribution information corresponding to image data, from an imaging apparatus to each object using the TOF method of measuring a delay time until reflected light is received from projected light for the object and measuring a distance from the object.

22. The image processing apparatus according to claim 1, wherein the control unit performs control for recording data of a RAW image before image processing which is image data output by imaging the object by the imaging unit in the first mode.

23. The image processing apparatus according to claim 22, wherein the RAW image is an image on which at least a part of image processing including a demosaicing process, white balance adjustment, a color conversion process, or gamma correction is not performed.

24. The image processing apparatus according to claim 1, wherein the control unit controls the recording unit to record each of the plurality of image data as a still image in one of the first mode and the second mode.

25. An imaging apparatus comprising: an image processing apparatus including;
an imaging sensor;
and at least one non-transitory memory device; at least one processor; an exposure condition control unit configured to control an exposure condition when the imaging sensor images an object and generates image data, wherein the image processing apparatus includes:
a recording unit configured to acquire a plurality of image data and record the plurality of image data in a recording medium; an acquisition unit configured to acquire depth distribution information of an object corresponding to image data; and a control unit configured to perform a process of recording the plurality of image data by performing switching between a first mode in which the recording unit records the image data and the depth distribution information corresponding to the image data in the recording medium and a second mode in which the recording unit records the image data in the recording medium without recording the depth distribution information, and wherein the exposure condition control unit acquires a motion amount of an object within an image of a frame in the first mode and determines one or more of a shutter speed and a frame rate related to imaging of the next frame after the frame from the motion amount and a frame interval;

wherein the exposure condition control unit, the recording unit, the acquisition unit and the control unit are implemented by the at least one processor executing at least one program recorded on the at least one non-transitory memory device.

26. A method of controlling an image processing apparatus including a recording unit configured to acquire a plurality of image data and record the plurality of image data in a recording medium, the method comprising:

acquiring depth distribution information of an object corresponding to image data; and performing a process of recording the plurality of image data by performing switching between a first mode in which the recording unit records the image data and the depth distribution information corresponding to the image data in the recording medium and a second mode in which the recording unit records the image data in the recording medium without recording the depth distribution information, wherein the depth distribution information is one of an image shift map based on parallax amounts of a plurality of viewpoint images, a defocus map based on a defocus amount for every region, a distance map indicating a relative distance relationship of objects in image data, and distance information indicating a distance relationship between an imaging apparatus and each object acquired according to a time of flight (TOF) method.

27. An image processing apparatus including
at least one non-transitory memory device;
at least one processor; and
a recording unit configured to acquire a plurality of image data and record the plurality of image data in a recording medium, the image processing apparatus comprising:

an acquisition unit configured to acquire depth distribution information of an object corresponding to image data; and a control unit configured to perform a process of recording the plurality of image data by performing switching between a first mode in which the recording unit records the image data and the depth distribution information corresponding to the image data in the recording medium and a second mode in which the recording unit records the image data in the recording medium without recording the depth distribution information, wherein the control unit performs a recording process by performing switching between the first mode and the second mode during recording of the plurality of image data and causes the recording unit to record the plurality of image data as a moving image in the recording medium, and wherein the recording unit records the plurality of image data and depth distribution information corresponding to image data on which a recording process is performed in the first mode in one moving-image file;

wherein the recording unit, the acquisition unit, and the control unit are implemented by the at least one processor executing at least one program recorded on the at least one non-transitory memory device.

28. The image processing apparatus according to claim 27, wherein the recording unit records depth distribution information corresponding to image data on which a recording process is performed in the first mode as metadata of the image data in front of or behind the image data in the moving-image file.

29. The image processing apparatus according to claim 27, wherein the control unit performs a recording process in the first mode for every predetermined frame in a plurality of images in time series acquired by the acquisition unit.

30. The image processing apparatus according to claim 27, wherein the control unit provides a notification of an image recorded in the first mode when a moving image recorded in the first mode is reproduced.

31. The image processing apparatus according to claim 27, wherein the depth distribution information is one of an image shift map based on parallax amounts of a plurality of viewpoint images, a defocus map based on a defocus amount for every region, a distance map indicating a relative distance relationship of objects in image data, and distance information indicating a distance relationship between an imaging apparatus and each object acquired according to a time of flight (TOF) method.

32. The image processing apparatus according to claim 27, wherein the control unit performs control for recording data of a RAW image before image processing in the first mode.

33. A method of controlling an image processing apparatus including a recording unit configured to acquire a plurality of image data and record the plurality of image data in a recording medium, the method comprising:

acquiring depth distribution information of an object corresponding to image data; and performing a process of recording the plurality of image data by performing switching between a first mode in which the recording unit records the image data and the depth distribution information corresponding to the image data in the recording medium and a second mode in which the recording unit records the image data in the recording medium without recording the depth distribution information, wherein performing performs a recording process by performing switching between the first mode and the second mode during recording of the plurality of image data and causes the recording unit to record the plurality of image data as a moving image in the recording medium, and wherein performing causes the recording unit to record the plurality of image data and depth distribution information corresponding to image data on which a recording process is performed in the first mode in one moving-image file.

* * * * *